United States Patent
Honma et al.

(10) Patent No.: US 9,731,440 B2
(45) Date of Patent: Aug. 15, 2017

(54) MOLDING MATERIAL AND RESIN-ADHERED REINFORCING FIBER BUNDLE

(75) Inventors: Masato Honma, Ehime (JP); Atsuki Tsuchiya, Ehime (JP); Keiichi Asami, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 26 days.

(21) Appl. No.: 13/138,030

(22) PCT Filed: Dec. 24, 2009

(86) PCT No.: PCT/JP2009/071373
§ 371 (c)(1),
(2), (4) Date: Sep. 26, 2011

(87) PCT Pub. No.: WO2010/074108
PCT Pub. Date: Jul. 1, 2010

(65) Prior Publication Data
US 2012/0015186 A1    Jan. 19, 2012

(30) Foreign Application Priority Data

Dec. 25, 2008 (JP) .................................. 2008-329109
Dec. 25, 2008 (JP) .................................. 2008-329110

(51) Int. Cl.
*D02G 3/36* (2006.01)
*C08L 23/10* (2006.01)
(Continued)

(52) U.S. Cl.
CPC ...... *B29C 45/0001* (2013.01); *B29C 45/0005* (2013.01); *C08L 23/10* (2013.01);
(Continued)

(58) Field of Classification Search
CPC ........ Y10T 428/2933; Y10T 428/2991; B29K 2023/12; B29K 2105/06; B29C 45/0005;
(Continued)

(56) References Cited

U.S. PATENT DOCUMENTS 5,047,263 A    9/1991 Glemet ...................... 427/203
5,514,745 A    5/1996 Yoshino ..................... 524/494
(Continued)

FOREIGN PATENT DOCUMENTS

EP    WO2006101269    *    9/2006
EP    WO2009/088033    *    7/2009
(Continued)

OTHER PUBLICATIONS

English translation of WO2009-088033 Itakura et al Jul. 2009.*

*Primary Examiner* — Camie Thompson
(74) *Attorney, Agent, or Firm* — Kubovcik & Kubovcik

(57) ABSTRACT

A molding material comprising the following components (A) to (D) at the following ratios, in which the component (D) is bonded to a composite comprising the components (A) to (C) and the order in the weight average molecular weight is component (D)>component (B)>component (C); (A) 1 to 75 wt % of a reinforcing fiber bundle; (B) 0.01 to 10 wt % of a first propylene-based resin; (C) 0.01 to 10 wt % of a second propylene-based resin having carboxylate groups bound to the polymer chains thereof; and (D) 5 to 98.98 wt % of a third propylene-based resin. A molding material of this invention provides a long fiber-reinforced thermoplastic resin molding material containing a propylene-based resin as the matrix resin, which allows the reinforcing fibers to be well dispersed into the molded article produced at the time of injection molding and allows the molded article produced to have excellent mechanical properties.

5 Claims, 4 Drawing Sheets

(51) Int. Cl.
*C08K 7/06* (2006.01)
*B29C 45/00* (2006.01)
*B29K 23/00* (2006.01)
*B29K 105/06* (2006.01)

(52) U.S. Cl.
CPC ...... *B29K 2023/12* (2013.01); *B29K 2105/06* (2013.01); *Y10T 428/2933* (2015.01)

(58) Field of Classification Search
CPC ....... C08L 23/10; C08J 2323/12; C08J 5/042; C08J 5/047; C08J 5/043; B32B 27/32; B32B 27/12
USPC .......... 524/423, 504, 528; 428/515–517, 375
See application file for complete search history.

(56) References Cited

U.S. PATENT DOCUMENTS

| | | | |
|---|---|---|---|
| 6,660,797 B1* | 12/2003 | Banno et al. | 524/505 |
| 7,442,435 B2* | 10/2008 | Lee et al. | 428/297.4 |
| 2001/0025074 A1 | 9/2001 | Saito et al. | 524/433 |
| 2002/0019182 A1 | 2/2002 | Ishibashi et al. | 442/59 |
| 2004/0220325 A1* | 11/2004 | Kitano et al. | 524/543 |
| 2006/0258810 A1 | 11/2006 | Sugiura et al. | 525/207 |
| 2009/0062426 A1 | 3/2009 | Shiraki et al. | 523/205 |
| 2010/0280153 A1* | 11/2010 | Itakura et al. | 524/13 |
| 2011/0263778 A1* | 10/2011 | Honma et al. | 524/495 |

FOREIGN PATENT DOCUMENTS

| | | | |
|---|---|---|---|
| JP | 59-002842 | * | 1/1984 |
| JP | 61-236832 A | | 10/1986 |
| JP | 04-316807 A | | 11/1992 |
| JP | 06-107442 A | | 4/1994 |
| JP | 06-345917 A | | 12/1994 |
| JP | 07-232324 A | | 9/1995 |
| JP | 08-090659 A | | 4/1996 |
| JP | 10-138379 A | | 5/1998 |
| JP | 10-156829 A | | 6/1998 |
| JP | 10-230517 A | | 9/1998 |
| JP | 2001-131418 A | | 5/2001 |
| JP | 2001-316534 A | | 11/2001 |
| JP | 2005-048343 A | | 2/2005 |
| JP | 2005-125581 A | | 5/2005 |
| JP | 2006-124852 A | | 5/2006 |
| WO | 2006/101269 A1 | | 9/2006 |

* cited by examiner

MOLDING MATERIAL AND RESIN-ADHERED REINFORCING FIBER BUNDLE

This application is a 371 of international application No. PCT/JP2009/071373 filed Dec. 24, 2009, and which claims priority based on Japanese patent application Nos. 2008-329109 and 2008-329110, both filed Dec. 25, 2008, and which are incorporated herein by reference.

TECHNICAL FIELD

The present invention relates to a long fiber-reinforced thermoplastic resin molding material containing an olefin-based resin as a matrix. Further, this invention relates to a resin-adhered reinforcing fiber bundle suitably used for the molding material.

BACKGROUND ART

Various modes such as prepregs, yarns and glass mats (GMT) are known as molding materials composed of continuous reinforcing fiber bundles and thermoplastic resins. These molding materials containing thermoplastic resins have such features that molding work and storage are easy and that the molded articles thereof have high toughness and excellent recyclability. Above all, processed molding materials provided as pellets are useful as industrial materials since they can be applied to molding methods excellent in economic efficiency and productivity such as injection molding and stamping.

However, because of problems of economic efficiency and productivity in the molding material production process, they are not so widely used. For example, a thermoplastic resin excellent in toughness and elongation generally has a high viscosity and it is difficult to make a reinforcing fiber bundle impregnated with the thermoplastic resin. Therefore, such a thermoplastic resin is not suitable for easily producing a molding material at high productivity. On the other hand, if a thermoplastic resin with a low viscosity is used in view of easy impregnation, there arises the problem that the obtained molded article greatly declines in mechanical properties.

On the contrary, disclosed is a molding material in which a thermoplastic resin with a high molecular weight is disposed in contact with a composite material consisting of a thermoplastic polymer with a low molecular weight and continuous reinforcing fibers (for example, Patent Document 1).

This molding material can achieve both good economic efficiency and productivity and good mechanical properties by using a resin with a low molecular weight for impregnation into a continuous reinforcing fiber bundle and using a resin with a high molecular weight as a matrix resin. Further, if this molding material is molded by an injection molding method, the reinforcing fibers can be easily mixed with the matrix resin with the break loss of the fibers kept minimized in the stage when the material is plasticized at the time of molding, and a molded article excellent in the dispersion of fibers can be produced. Therefore, since the reinforcing fibers can remain longer than before in the obtained molded article, the molded article can have both good mechanical properties and excellent appearance quality.

However, in recent years, fiber-reinforced composite materials attract more attention and find expanded applications, and in this connection, a molding material more excellent in moldability and handling properties and capable of being molded into articles with more excellent mechanical properties is required. Further, higher economic efficiency and productivity are industrially required. For example, since fiber-reinforced composite materials are requested to be lighter in weight and higher in economic efficiency, light-weight olefin-based resins, particularly propylene-based resins begin to be used as matrix resins. Patent Document 2 discloses long-fiber pellets, in which carbon fibers treated by a sizing agent having a functional group capable of reacting with an acid radical are impregnated with an acid-modified olefin-based resin. However, the thermoplastic resin used in the pellets is an acid-modified olefin-based resin only, and since it has a high viscosity, it is very difficult to disperse a carbon fiber bundle. Consequently the molded article obtained from the long-fiber pellets has problems in mechanical properties and appearance.

Further, attempts are made to enhance the interfacial adhesiveness by treating the surfaces of reinforcing fibers or applying a sizing agent to the fibers, in order to enhance the mechanical properties of the molded article. Patent Document 3 describes a fiber treating agent containing a polypropylene-based resin modified by an unsaturated dicarboxylic acid or a salt thereof, and Patent Document 4 discloses applying an acid-modified polypropylene resin with an acid value of 23 to 120 mg KOH/g as a sizing agent suitable for polypropylene resin. However, neither of the proposals allows sufficient interfacial adhesiveness to be obtained.

Furthermore, Patent Document 5 discloses carbon fibers to which 0.1 to 8 wt % of an ionomer resin is adhered. Likewise, Patent Document 6 describes carbon fibers to which 0.1 to 8 wt % of two different acid-modified polypropylene-based resins are adhered. Both the patent documents are intended to enhance the interfacial adhesiveness between carbon fibers and a matrix resin by applying a polymer having affinity with an olefin resin to the carbon fibers.

However, as clearly described in these patent documents, since only a modified olefin component such as an ionomer resin or self-emulsifiable polypropylene-based resin is mainly adhered to reinforcing fibers, the film of the resin component is not sufficiently formed, and the interfacial adhesiveness and the handling properties of the fiber bundle cannot be sufficiently enhanced.

Patent Document 1: JP 10-138379 A
Patent Document 2: JP 2005-125581 A
Patent Document 3: JP 6-107442 A
Patent Document 4: JP 2005-48343 A
Patent Document 5: JP 2006-124852 A
Patent Document 6: WO 2006/101269

DISCLOSURE OF THE INVENTION

Problems to be Solved by the Invention

As can be seen from the above explanation, required is a long fiber-reinforced thermoplastic resin molding material that can exhibit high mechanical properties and is good in the dispersion of reinforcing fibers even in the case where a low-polar olefin-based resin is used as the matrix resin.

Further, according to the prior art, it is difficult to obtain a reinforcing fiber bundle that can exhibit excellent interfacial adhesiveness and has good handling properties in the case where the reinforcing fiber bundle is molded with an olefin-based resin as the matrix resin, and it is desired to develop a reinforcing fiber bundle that can satisfy these properties.

An object of this invention is to provide a long fiber-reinforced thermoplastic resin molding material containing a propylene-based resin as the matrix resin, which allows the reinforcing fibers to be well dispersed into the molded article produced at the time of injection molding and allows the molded article produced to have excellent mechanical properties.

Another object is to provide a resin-adhered reinforcing fiber bundle excellent in the adhesiveness between the matrix resin comprising a thermoplastic resin, particularly a polyolefin-based matrix resin and reinforcing fibers, and good in handling properties.

Means for Solving the Problems

The inventors made an inventive study to achieve the abovementioned objects, and as a result, found the following molding material and resin-adhered reinforcing fiber bundle which can solve the abovementioned problems.

A molding material comprising the following components (A) to (D) at the following ratios, in which the component (D) is bonded to a composite comprising the components (A) to (C) and the order in the weight average molecular weight is component (D)>component (B)>component (C);
(A) 1 to 75 wt % of a reinforcing fiber bundle;
(B) 0.01 to 10 wt % of a first propylene-based resin;
(C) 0.01 to 10 wt % of a second propylene-based resin having carboxylate groups bound to the polymer chains thereof;
(D) 5 to 98.98 wt % of a third propylene-based resin.

A resin-adhered reinforcing fiber bundle, wherein a mixture comprising a first propylene-based resin (B) and a second propylene-based resin (C) is adhered to a reinforcing fiber bundle (A); the weight average molecular weight of the first propylene-based resin (B) is larger than the weight average molecular weight of the second propylene-based resin (C); the second propylene-based resin (C) is a propylene-based resin having carboxylate groups bound to the polymer chains thereof; the adhered amount of the mixture comprising the first propylene-based resin (B) and the second propylene-based resin (C) is in a range from 0.1 to 30 parts by weight per 100 parts by weight of the reinforcing fiber bundle (A); and the content of the second propylene-based resin (C) is 0.3 to 45 parts by weight per 100 parts by weight of the first propylene-based resin (B).

Effects of the Invention

In the case where the long fiber-reinforced thermoplastic resin molding material of this invention is injection-molded, the dispersion of the reinforcing fibers into the molded article produced is good, and the molded article produced can have excellent mechanical properties. Further, since propylene-based resins are used, the molded article obtained is excellently light in weight.

Further, the resin-adhered reinforcing fiber bundle of this invention is excellent in the adhesiveness to the matrix resin comprising a thermoplastic resin, and good in handling properties and fiber dispersibility at the time of molding.

The molding material and resin-adhered reinforcing fiber bundle of this invention are very useful as various parts and members of motor vehicles, electric and electronic apparatuses, household electric appliances, etc.

MODES FOR CARRYING OUT THE INVENTION

Figure 1:
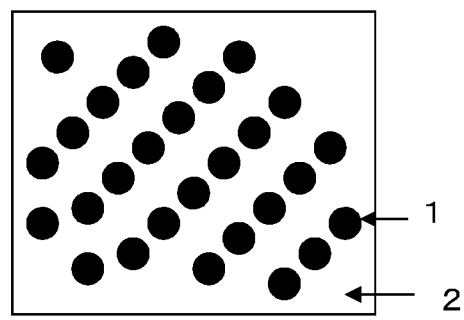
FIG. 1 is a schematic drawing showing one mode of the composite consisting of a reinforcing fiber bundle, a first polypropylene-based resin and a second polypropylene-based resin.

The molding material of this invention is a molding material in which a third propylene-based resin (D) is bonded to a composite comprising reinforcing fibers (A), a first propylene-based resin (B) and a second propylene-based resin (C). Further, the resin-adhered reinforcing fiber bundle of this invention is a resin-adhered reinforcing fiber bundle in which a mixture comprising a first propylene-based resin (B) and a second propylene-based resin (C) is adhered to reinforcing fibers (A). In the molding material of this invention, the reinforcing fiber bundle (A), the first propylene-based resin (B) and the second propylene-based resin (C) as three components form a composite, i.e., resin-adhered reinforcing fibers. The mode of the composite is as shown in FIG. 1, and the gaps among the single fibers of the reinforcing fiber bundle (A) are filled with a mixture consisting of the first propylene-based resin (B) and the second propylene-based resin (C). That is, the reinforcing fibers are dispersed like islands in the sea of the mixture consisting of the first propylene-based resin (B) and the second propylene-based resin (C).

Figure 2:
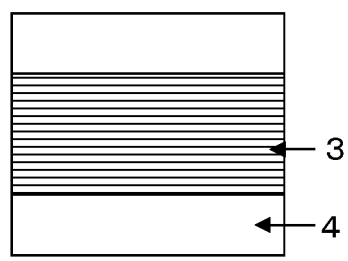
FIG. 2 is a schematic drawing showing a preferred mode of the molding material of this invention, as a cross sectional form in the axial center direction.

In the molding material of this invention, for example as shown in FIG. 2, a third propylene-based resin (D) is disposed to adhere to the composite (resin-adhered reinforcing fibers) consisting of the reinforcing fiber bundle (A), the first propylene-based resin (B) and the second propylene-based resin (C). The third propylene-based resin (D) is a component destined to be the matrix resin after the molding material of this invention is molded. At first, these components (A) to (D) will be explained.

The reinforcing fiber bundle (A) is not especially limited, and for example, fibers with high strength and high elastic modulus such as carbon fibers, glass fibers, aramid fibers, alumina fibers, silicon carbide fibers, boron fibers and metal fibers can be used. Any one type of the fibers can be used alone, or two or more types can also be used together. Among them, carbon fibers based on PAN, pitch or rayon, etc. are preferred in view of obtaining a molded article with higher mechanical properties and the effect of reducing the weight of the molded article. Among them, PAN-based carbon fibers are especially preferred in view of the balance between the strength and elastic modulus of the obtained molded article. Further, for the purpose of giving electroconductivity, reinforcing fibers covered with a metal such as nickel, copper or ytterbium can also be used.

Further, as the carbon fibers, it is preferred that the surface oxygen concentration ratio [O/C] as the ratio of the number of oxygen (O) atoms to the number of carbon (C) atoms on the surfaces of the fibers measured by X-ray photoelectron spectroscopy is 0.05 to 0.5. A more preferred range is 0.08 to 0.4, and a further more preferred range is 0.1 to 0.3. If the surface oxygen concentration ratio is 0.05 or more, a sufficient amount of functional groups exist on the surfaces of carbon fibers, and the carbon fibers can be strongly adhered to the thermoplastic resin. The upper limit of the surface oxygen concentration ratio is not especially limited, but 0.5 or less is preferred in view of the balance between the handling properties and productivity of carbon fibers.

The surface oxygen concentration ratio of carbon fibers is obtained by X-ray photoelectron spectroscopy according to the procedure described later. In the case where a sizing agent or the like is deposited on the surfaces of carbon fibers, it should be removed using a solvent or the like before measurement.

The means for controlling the surface oxygen concentration ratio [O/C] at 0.05 to 0.5 is not especially limited. For example, such a method as electrolytic oxidation treatment, chemical liquid oxidation treatment or vapor phase oxidation treatment can be used. Among them, electrolytic oxidation treatment is preferred.

Further, the average fiber diameter of the reinforcing fibers is not especially limited, but in view of the mechanical properties and surface appearance of the obtained molded article, it is preferred that the average fiber diameter is in a range from 1 to 20 μm. A more preferred range is 0.3 to 15 μm. The number of single fibers of a reinforcing fiber bundle is not especially limited, but a range from 100 to 350,000 fibers is preferred. A more preferred range is 1,000 to 250,000 fibers. In view of productivity of reinforcing fibers, it is preferred that the number of single fibers is larger. A further more preferred range is 20,000 to 100,000 fibers.

As the first propylene-based resin (B), propylene homopolymer or a copolymer consisting of propylene and another monomer can be used. In this case, preferred examples of the other monomer include α-olefins, conjugated dienes, nonconjugated dienes, etc. Particular examples include α-olefins with 2 to 12 carbon atoms excluding propylene, such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene and 1-dodecene, butadiene, ethylidene norbornene, dicyclopentadiene, 1,5-hexadiene, etc. Any one of these monomers can be used or two or more of them can also be used together. The copolymer can be a random copolymer or block copolymer. Suitable examples of the copolymer include ethylene-propylene copolymer, propylene-1-butene copolymer, ethylene-propylene-1-butene copolymer, etc.

Especially in order to enhance the affinity with the third propylene-based resin (D) used as the matrix resin, it is preferred that the first propylene-based resin (B) contains 50 mol % or more of propylene units as recurring units. Further, in order to lower the crystallinity of the first propylene-based resin (B), to enhance the affinity with the second propylene-based resin (C) and to enhance the strength of the obtained molded article, it is preferred that the first propylene-based resin (B) contains 50 to 99 mol % of building blocks derived from propylene. A more preferred range is 55 to 98 mol %, and a further more preferred range is 60 to 97 mol %.

The recurring units of the propylene-based resin can be identified by ordinary analysis methods of polymer compounds such as IR, NMR, mass analysis and elemental analysis.

Further, it is preferred that the first propylene-based resin (B) is substantially unmodified in order to secure the strength of the resin per se and to enhance the adhesiveness between the resin and the reinforcing fibers. In this case, being substantially unmodified is desirably being not modified at all or being modified to such an extent that the aforementioned objects may not be impaired. Particularly, being substantially unmodified means that the carboxylic acid groups and/or carboxylate groups represented by formula (I)

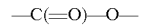   Formula (I)

are not contained at all or contained by less than 0.05 millimole equivalent in total per 1 g of the resin. Preferred is 0.01 millimole equivalent or less, and more preferred is 0.001 millimole equivalent or less. Further more preferred is 0.0001 millimole equivalent or less.

Furthermore, it is preferred that the weight average molecular weight of the first propylene-based resin (B) is 30,000 to less than 150,000, in view of the roles as the impregnation aid and the dispersion aid described later, film formability, the strength of the film and the affinity with the third propylene-based resin (D) used as the matrix resin. It is more preferred that the lower limit of the weight average molecular weight is 35,000 or more. Further more preferred is more than 50,000, and especially preferred is 60,000 or more. It is more preferred that the upper limit of the weight average molecular weight is 140,000 or less, and further more preferred is 130,000 or less.

It is preferred that the MI (melt index: 230° C.) of the first propylene-based resin (B) is 50 or more, and that the molecular weight distribution (Mw/Mn) of the first propylene-based resin (B) is 2.5 or more. The upper limit of the molecular weight distribution (Mw/Mn) is not especially limited, but preferred is 50 or less. More preferred is 30 or less.

The first propylene-based resin (B) may contain a propylene-based resin with a weight average molecular weight of 150,000 or more. In this case, it is preferred that the first propylene-based resin (B) contains 30 to 100 wt % of a propylene-based resin (B-1) with a weight average molecular weight of 30,000 to less than 150,000 and 0 to 70 wt % of a propylene-based resin (B-2) with a weight average molecular weight of 150,000 to 500,000. Further, it is more preferred that the weight average molecular weight of the propylene-based resin (B-2) is 150,000 to 450,000. If the upper limit of the weight average molecular weight is too large, the effects as an impregnation aid and a dispersion aid decline, and therefore it is preferred that the weight average molecular weight is in the abovementioned range. It is more preferred that the mixed amount of the propylene-based resin (B-1) is 35 to 100 wt % and that the mixed amount of the propylene-based resin (B-2) is 0 to 65 wt %.

As described before, it is preferred that the first propylene-based resin (B) is substantially unmodified in view of the strength of the resin per se and the adhesiveness between the resin and the reinforcing fibers. However, in the case where the third propylene-based resin (D) used as the matrix resin is an acid-modified propylene-based resin, the first propylene-based resin (B) can also be modified. In this case, if the first propylene-based resin (B) has carboxylate groups bound to the polymer chains thereof, the affinity with the matrix resin can be enhanced.

In this case, it is preferred that the weight average molecular weight (Mw) of the first propylene-based resin (B) is more than 50,000 and not more than 150,000. A more preferred range is 60,000 to 130,000.

Further, it is desirable in view of the stability of the aqueous dispersion and the adhesiveness to the fibers that all the carboxylic acid groups contained in the first propylene-based resin (B) are neutralized by the abovementioned basic substance into carboxylate groups, but some carboxylic acid groups may remain without being neutralized. The detail is the same as that for the second propylene-based resin (C) described later.

In the case where the first propylene-based resin (B) has carboxylic acid groups and/or carboxylate groups bound to the polymer chains thereof, it is preferred that the total amount of the carboxylic acid groups and carboxylate groups is 0.05 millimole equivalent or more per 1 g of the first propylene-based resin (B). A more preferred range is 0.05 to 2 millimole equivalents, and a further more preferred range is 0.1 to 1 millimole equivalent.

Further, it is preferred that the total amount in terms of the groups represented by —C(=O)—O— per 1 g of the resin, i.e., the content (in millimole equivalents) of carboxylic acid groups and/or carboxylate groups of the second propylene-based resin (C) per 1 g of the resin is larger than that of the first propylene-based resin (B). The carboxylate groups of the first propylene-based resin (B) have the effect of enhancing the affinity with the acid-modified polypropylene resin used as the matrix resin, but the content of the carboxylate groups of the first propylene-based resin (B) is not required to be so large as that of the carboxylate groups of the second propylene-based resin (C), the interaction of which with the reinforcing fibers is required to be taken into consideration.

The first propylene-based resin (B) having carboxylate groups can be produced by the same method as that of the second propylene-based resin (C) described later. Further, the method for measuring the content of carboxylic acid groups and/or carboxylate groups and the preferred ratio of carboxylic acid groups to carboxylate groups are also the same as those of the second propylene-based resin (C) described later.

The second propylene-based resin (C) is a propylene-based resin having carboxylate groups bound to the polymer chains thereof. The reason is that the carboxylate groups contained are effective for enhancing the interaction with the reinforcing fibers.

A propylene-based resin having carboxylate groups can be obtained by using a propylene-based resin having the carboxylic acid groups as a precursor and neutralizing the carboxylic acid groups of the precursor, or using a propylene-based resin having carboxylic acid ester groups as a precursor and saponifying the carboxylic acid ester groups as the precursor.

As the precursor of the second propylene-based resin (C), a product obtained by graft-polymerizing a monomer having a carboxylic acid group and/or a monomer having a carboxylic acid ester group to polypropylene or a copolymer consisting of propylene and one or more α-olefins such as ethylene-propylene copolymer, propylene-1-butene copolymer or ethylene-propylene-1-butene copolymer can be used. The copolymer can be a random copolymer or block copolymer and a monomer other than α-olefins can also be contained as recurring units.

In this case, examples of the monomer having a carboxylic acid group and the monomer having a carboxylic acid ester group include ethylene-based unsaturated carboxylic acids, anhydrides thereof, esters thereof, etc. Examples of the ethylene-based unsaturated carboxylic acids include (meth)acrylic acid, maleic acid, fumaric acid, tetrahydrophthalic acid, itaconic acid, citraconic acid, crotonic acid, isocrotonic acid, etc. Examples of the anhydrides thereof include Nadic acid™ (endocis-bicyclo[2,2,1]hepto-5-ene-2,3-dicarboxylic acid), maleic anhydride, citraconic anhydride, etc. Among them, an acid anhydride is preferred, and maleic anhydride is more preferred.

Monomers other than olefins include alkyl(meth)acrylates such as methyl(meth)acrylate, ethyl(meth)acrylate, propyl (meth)acrylate, n-butyl(meth)acrylate, i-butyl(meth)acrylate, tert-butyl(meth)acrylate, n-amyl(meth)acrylate, isoamyl(meth)acrylate, n-hexyl(meth)acrylate, 2-ethylhexyl (meth)acrylate, octyl(meth)acrylate, decyl(meth)acrylate, dodecyl(meth)acrylate, octadecyl(meth)acrylate, stearyl (meth)acrylate, tridecyl(meth)acrylate, lauroyl(meth)acrylate, cyclohexyl(meth)acrylate, benzyl(meth)acrylate, phenyl(meth)acrylate, isoboronyl(meth)acrylate, dicyclopentanyl(meth)acrylate, dicyclopentenyl(meth)acrylate, dimethylaminoethyl(meth)acrylate and diethylaminoethyl(meth)acrylate; hydroxyl group-containing vinyls such as hydroxyethyl acrylate, 2-hydroxyethyl(meth)acrylate, 2-hydroxypropyl(meth)acrylate, 4-hydroxybutyl acrylate, lactone-modified hydroxyethyl(meth)acrylate and 2-hydroxy-3-phenoxypropylacrylate; epoxy group-containing vinyls such as glycidyl(meth)acrylate and methylglycidyl (meth)acrylate; isocyanate group-containing vinyls such as vinyl isocyanate and isopropenyl isocyanate; aromatic vinyls such as styrene, α-methylstyrene, vinyltoluene and t-butylstyrene; amides such as acrylamide, methacrylamide, N-methylolmethacrylamide, N-methylolacrylamide, diacetone acrylamide and maleic acid amide; vinyl esters such as vinyl acetate and vinyl propionate; aminoalkyl(meth)acrylates such as N,N-dimethylaminoethyl(meth)acrylate, N,N-diethylaminoethyl(meth)acrylate, N,N-dimethylaminopropyl(meth)acrylate, N,N-dipropylaminoethyl(meth)acrylate, N,N-dibutylaminoethyl(meth)acrylate and N,N-dihydroxyethylaminoethyl(meth)acrylate; unsaturated sulfonic acids such as styrenesulfonic acid, sodium styrenesulfonate and 2-acrylamide-2-methylpropanesulfonic acid; unsaturated phosphoric acids such as mono(2-methacryloyloxyethyl) acid phosphate; etc. In this case, "(meth)acrylate" means acrylate or methacrylate. Any one of these monomers can be used alone, or two or more of them can also be used together.

The abovementioned precursor of the second propylene-based resin (C) can be obtained by various methods. Examples of the methods include a method of reacting a propylene-based resin, an ethylene-based unsaturated carboxylic acid having an unsaturated vinyl group and a monomer having an unsaturated vinyl group other than olefins in an organic solvent in the presence of a polymerization initiator, and removing the solvent; a method of heating and melting a propylene-based resin, reacting a carboxylic acid having an unsaturated vinyl group and a polymerization initiator with the obtained molten substance with stirring; a method of supplying a mixture consisting of a propylene-based resin, a carboxylic acid having an unsaturated vinyl group and a polymerization initiator to an extruder, and heating and kneading while reacting; etc.

In the above, examples of the polymerization initiator include benzoyl peroxide, dichlorobenzoyl peroxide, dicumyl peroxide, di-tert-butyl peroxide, 2,5-dimethyl-2,5-di(peroxybenzoate)hexyne-3,1,4-bis(tert-butyl peroxyisopropyl)benzene, etc. Any one of them can be used alone or two or more of them can also be used as a mixture.

Further, examples of the organic solvent include aromatic hydrocarbons such as xylene, toluene and ethylbenzene; aliphatic hydrocarbons such as hexane, heptane, octane, decane, isooctane and isodecane; alicyclic hydrocarbons such as cyclohexane, cyclohexene, methylcyclohexane and ethylcyclohexane; ester-based solvents such as ethyl acetate, n-butyl acetate, cellosolve acetate, propylene glycol monomethyl ether acetate, propylene glycol monoethyl ether acetate and 3-methoxybutyl acetate; and ketone-based solvents such as methyl ethyl ketone and methyl isobutyl ketone. Two or more of them can also be used as a mixture. Among them, aromatic hydrocarbons, aliphatic hydrocarbons and alicyclic hydrocarbons are preferred. Aliphatic hydrocarbons and alicyclic hydrocarbons can be more suitably used.

If the precursor of the second propylene-based resin (C) obtained as described above is neutralized or saponified, the second propylene-based resin (C) having carboxylate groups bound to the polymer chains thereof can be obtained. In the case where neutralization or saponification is performed, it is preferred to prepare an aqueous dispersion of the precursor of the second propylene-based resin (C) for performing the treatment, since the treatment can be performed easily.

Further, examples of the basic substance used for neutralization or saponification include metals such as sodium, potassium, lithium, calcium, magnesium and zinc; oxides, hydroxides, hydrides and weak acid salts of these metals; inorganic amines such as hydroxylamine and ammonium hydroxide; and organic amines such as ammonia, (tri)methylamine, (tri)ethanolamine, (tri)ethylamine, dimethylethanolamine and morpholine. The carboxylate groups suitably used for neutralization or saponification can be one or more salts selected from lithium salts, potassium salts, sodium salts, calcium salts, magnesium salts, zinc salts and ammonium salts.

Furthermore, it is preferred in view of the stability of the aqueous dispersion and the adhesiveness to the fibers that all the carboxylic acid groups contained in the second propylene-based resin (C) are neutralized into carboxylate groups by any of the abovementioned basic substances, but some carboxylic acid groups may also remain without being neutralized. Particularly it is preferred that the molar ratio of the amount of the carboxylate groups to the total amount of the carboxylic acid groups and carboxylate groups is 50 to 100%. A more preferred range is 70 to 100%, and a furthermore preferred range is 85 to 100%. This molar ratio is called the conversion ratio.

The methods for analyzing the contents of the carboxylic acid groups and carboxylate groups include a method of detecting the metal species forming the salt by ICP emission spectroscopy and a method of identifying and determining carbonyl carbon using IR, NMR, mass analysis, elemental analysis, etc.

To measure the number of moles of the carboxylic acid groups not neutralized, at first, the propylene-based resin is dissolved into heated toluene, and 0.1N potassium hydroxide-ethanol standard solution is used for titration. The acid value of the propylene-based resin is obtained from the following formula.

$$\text{Acid value} = (5.611 \times A \times F)/B \text{ (mg KOH/g)}$$

A: Amount of 0.1N potassium hydroxide-ethanol standard solution used (ml)
F: Factor of 0.1N potassium hydroxide-ethanol standard solution
B: Amount of sample (g)

The acid value calculated as above is used to calculate the number of moles of the carboxylic acid groups not neutralized, from the following formula.

$$\text{Number of moles of the carboxylic acid groups not neutralized} = \text{Acid value} \times 1{,}000/56 \text{ (moles/g)}$$

The conversion ratio of carboxylic acid groups into a neutralized salt is calculated from the following formula using the total number of moles of the carboxylic acid groups and carboxylate groups (moles/g) calculated by determining the carbonyl carbon of carboxylic acid groups using IR, NMR, elemental analysis, etc.

$$\text{Conversion ratio \%} = (1 - r) \times 100 (\%)$$

r: Number of moles of the carboxylic acid groups not neutralized/Total number of moles of carboxylic acid groups and carboxylate groups Further, in view of higher interaction with the reinforcing fibers, it is preferred that the total amount of the carboxylic acid groups and carboxylate groups bound to the polymer chains of the second propylene-based resin (C) is 0.05 to 5 millimole equivalents per 1 g of the second propylene-based resin (C). A more preferred range is 0.1 to 4 millimole equivalents, and a further more preferred range is 0.3 to 3 millimole equivalents.

In view of playing the roles as the impregnation aid and the dispersion aid described later and in view of forming the intertwining of molecular chains with the first propylene-based resin (B) for enhancing the interaction with the first propylene-based resin (B), it is preferred that the weight average molecular weight (Mw) of the second propylene-based resin (C) is 1,000 to 50,000. A more preferred range is 2,000 to 40,000, and a further more preferred range is 5,000 to 30,000. Meanwhile, the weight average molecular weight is measured using gel permeation chromatography (GPC).

The third propylene-based resin (D) can be propylene homopolymer or a copolymer consisting of propylene and at least one α-olefin, conjugated diene or nonconjugated diene, etc.

Examples of the α-olefin include α-olefins with 2 to 12 carbon atoms excluding propylene, such as ethylene, 1-butene, 3-methyl-1-butene, 4-methyl-1-pentene, 3-methyl-1-penten, 4-methyl-1-hexene, 4,4-dimethyl-1-hexene, 1-nonene, 1-octene, 1-heptene, 1-hexene, 1-decene, 1-undecene and 1-dodecene. Examples of the conjugated diene and nonconjugated diene include butadiene, ethylidene norbornene, dicyclopentadiene and 1,5-hexadiene. Any one of these other monomers can be used alone or two or more of them can also be used together.

The copolymer can be a random copolymer or block copolymer and can also contain a monomer other than α-olefins as recurring units. Suitable examples of the copolymer include polypropylene, ethylene-propylene copolymer, propylene-1-butene copolymer, ethylene-propylene-1-butene copolymer, etc.

In view of higher mechanical properties of the obtained molded article, it is preferred that the third propylene-based resin (D) is a modified propylene-based resin. Preferred is an acid-modified propylene-based resin or a propylene-based resin having carboxylic acid groups and/or carboxylate groups bound to the polymer chains thereof. The aforementioned acid-modified propylene-based resin can be obtained by various methods, and can be produced, for example, like the aforementioned second propylene-based resin (C).

In the case where the third propylene-based resin (D) has carboxylic acid groups and/or carboxylate groups bound to the polymer chains thereof, it is preferred that the content of the carboxylic acid groups and/or carboxylate groups bound to the polymer chains of the third propylene-based resin (D) as the total amount of carboxylic acid groups and carboxylate groups is 0.05 to 4 millimole equivalents per 1 g of the third propylene-based resin (D). A more preferred range is 0.1 to 3 millimole equivalents, and a further more preferred range is 0.2 to 2 millimole equivalents. The conversion ratio of the carboxylic acid groups is the same as that for the aforementioned second propylene-based resin (C).

In the case where a propylene-based resin having carboxylic acid groups and/or carboxylate groups bound to the polymer chains thereof is contained in the third propylene-based resin (D), a mixture with a non-modified propylene-based resin is preferred in view of high mechanical properties of the resin and raw material cost. Particularly it is preferred that the third propylene-based resin (D) contains 5 to 50 wt % of a propylene-based resin (D-1) having carboxylic acid groups and/or carboxylate groups bound to the polymer chains thereof and 50 to 95 wt % of a propylene-based resin (D-2) not having carboxylic acid groups and/or carboxylate groups. It is more preferred that the content of the component (D-1) is 5 to 45 wt % and that the content of the component (D-2) is 55 to 95 wt %. It is further more preferred that the content of the component (D-1) is 5 to 35 wt % and that the content of the component (D-2) is 65 to 95 wt %.

Further, the third propylene-based resin (D) may contain an impact resistance enhancing agent such as an elastomer or rubber component, filler and other additives to such an extent that the objects of this invention are not impaired. These additives include an inorganic filler, flame retarder, electroconducting agent, crystal nucleating agent, ultraviolet light absorber, antioxidant, vibration damper, antimicrobial agent, insecticide, deodorant, coloration preventing agent, thermal stabilizer, releasing agent, antistatic agent, plasticizer, lubricant, colorant, pigment, dye, foaming agent, foam stabilizer and coupling agent.

In the case where the molding material of this invention is injection-molded, the molding material is melt-kneaded in the cylinder of an injection molding machine. In this case, the mixture consisting of the first propylene-based resin (B) and the second propylene-based resin (C) is diffused into the third propylene-based resin (D), to assist the diffusion of the reinforcing fiber bundle (A) into the third propylene-based resin (D) and also to assist the impregnation of the third propylene-based resin (D) into the reinforcing fiber bundle (A). That is, the mixture consisting of the first propylene-based resin (B) and the second propylene-based resin (C) plays the roles of an impregnation aid and a dispersion aid. For achieving the roles, if the order of the components (B), (C) and (D) in the weight average molecular weight is (D)>(B)>(C), the components (B) and (C) can be easily diffused into the component (D).

In the case where the first to third propylene-based resins are propylene-based resins having carboxylic acid groups and/or carboxylate groups bound to the polymer chains thereof, it is preferred that the order in the content of the carboxylic acid groups and/or carboxylate groups or the order in the total amount in terms of the groups represented by —C(=O)—O— per 1 g of each resin, i.e., the order in the millimole equivalents of the carboxylic acid groups and/or carboxylate groups per 1 g of each group is component (C) ≥ component (B) ≥ component (D). As for the reason, in view of the adhesion to the reinforcing fibers, it is preferred that the first and second propylene-based resins compounded with the reinforcing fibers have more carboxylic acid groups and/or carboxylate groups. It is especially preferred that the second propylene-based resin (C) with a small weight average molecular weight have more carboxylic acid groups and/or carboxylate groups, the second propylene-based resin (C) exists nearer to the reinforcing fibers to enhance the adhesion to the reinforcing fibers and the dispersibility of the reinforcing fibers. The third propylene-based resin (D) is not required to have so large interaction with the reinforcing fibers as the first and second propylene-based resins, and therefore in view of resin cost, it is preferred that the third propylene-based resin (D) contains less carboxylic acid groups and/or carboxylate groups.

The molding material of this invention contains the reinforcing fiber bundle (A), the first propylene-based resin (B), the second propylene-based resin (C) and the third propylene-based resin (D) at the following ratios with the total amount of the respective components as 100 wt %.

The content of the reinforcing fiber bundle (A) is 1 to 75 wt %. A preferred range is 5 to 65 wt %, and a more preferred range is 10 to 50 wt %. If the content of the reinforcing fiber bundle (A) is less than 1 wt %, the mechanical properties of the obtained molded article may be insufficient as the case may be, and if the content is more than 75 wt %, flowability during injection molding may decline as the case may be.

The content of the first propylene-based resin (B) is 0.01 to 10 wt %. A preferred range is 0.5 to 9 wt %, and a more preferred range is 1 to 8 wt %. The content of the second propylene-based resin (C) is 0.01 to 10 wt %. A preferred range is 0.5 to 9 wt %, and a more preferred range is 1 to 8 wt %. If the content of the first propylene-based resin (B) or the second propylene-based resin (C) is less than 0.1 wt %, the moldability of the molding material, that is, the dispersion of the reinforcing fibers during molding may be insufficient as the case may be. If the content of the first propylene-based resin (B) or the second propylene-based resin (C) is more than 10 wt %, the mechanical properties of the thermoplastic resin used as the matrix resin may decline as the case may be.

Further, the content of the third propylene-based resin (D) is 5 to 98.98 wt %. A preferred range is 25 to 94 wt %, and a more preferred range is 50 to 88 wt %. If the content of the third propylene-based resin (D) is in this range, the effects of this invention can be achieved.

In the molding material of this invention, it is preferred that the single fibers constituting the reinforcing fiber bundle (A) are arranged in one direction and are continuous in the longitudinal direction. It is not necessarily required that all the single fibers of the reinforcing fiber bundle are continuous over the entire length, and some single fibers may be cut halfway. The continuous reinforcing fiber bundle can be a unidirectional fiber bundle, bidirectional fiber bundle or multidirectional fiber bundle, etc. However, in view of the productivity in the process for producing the molding material, a unidirectional fiber bundle can be more preferably used.

In the molding material of this invention, it is preferred that the reinforcing fiber bundle (A) is arranged in almost parallel to the axial center direction of the molding material, and that the lengths of the reinforcing fibers constituting the reinforcing fiber bundle (A) are substantially the same as the length of the molding material.

"Being arranged in almost parallel" in this case shows a state where the axial line of the major axis of the reinforcing fiber bundle and the axial line of the major axis of the molding material point to the same direction. It is preferred that the angular difference between both the axial lines is 20° C. or less. More preferred is 10° or less, and further more preferred is 5° or less.

Further, "being substantially the same in the length" means that reinforcing fibers significantly shorter than the overall length of the molding material are not substantially contained. Particularly, in the case where the content of the reinforcing fibers with lengths of not longer than 50% of the overall length of the molding material is 30 wt % or less based on the amount of all the reinforcing fibers, it can be considered that reinforcing fibers significantly shorter than the overall length of the molding material are not substantially contained. Further, it is preferred that the content of the reinforcing fibers with lengths not longer than 50% of the overall length of the molding material is 20 wt % or less. Meanwhile, the overall length of the molding material is the length in the direction in which the reinforcing fibers are oriented in the molding material. If the reinforcing fibers have a length equivalent to that of the molding material, the length of the reinforcing fibers in the molded article can be kept long, and therefore excellent mechanical properties can be obtained.

FIGS. 2, 4, 6 and 8 typically show examples of the cross sectional form in the axial center direction of the molding material of this invention, and FIGS. 3, 5, 7 and 9 typically show examples of the cross sectional form in the direction perpendicular to the axial center direction of the molding material of this invention.

The cross sectional forms of the molding material are not limited to those shown in the drawings, if the third propylene-based resin (D) is disposed to adhere to the composite (resin-adhered reinforcing fiber bundle) consisting of the reinforcing fiber bundle (A), the first propylene-based resin (B) and the second propylene-based resin (C). However, preferred is the configuration in which the resin-adhered reinforcing fiber bundle is arranged as the core between the layers of the third propylene-based resin (D) as shown in the cross sectional views in the axial center direction as FIGS. 2, 4 and 6.

Figure 3:
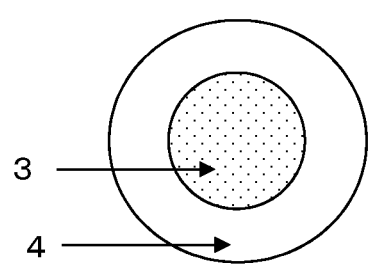
FIG. 3 is a schematic drawing showing the molding material of FIG. 2, as a cross sectional form in the direction perpendicular to the axial center direction.
Figure 4:
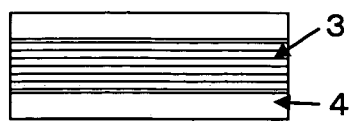
FIG. 4 is a schematic drawing showing another preferred mode of the molding material of this invention, as a cross sectional form in the axial center direction.
Figure 5:
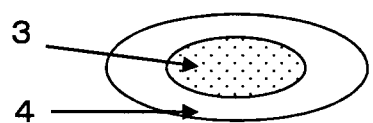
FIG. 5 is a schematic drawing showing the molding material of FIG. 4, as a cross sectional form in the direction perpendicular to the axial center direction.
Figure 6:
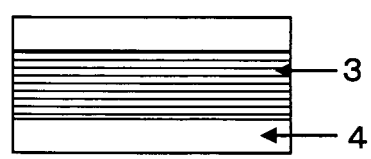
FIG. 6 is a schematic drawing showing a further other preferred mode of the molding material of this invention, as across sectional form in the axial center direction.
Figure 7:
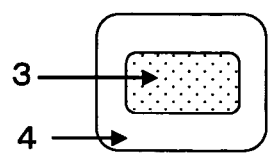
FIG. 7 is a schematic drawing showing the molding material of FIG. 6, as a cross sectional form in the direction perpendicular to the axial center direction.
Figure 8:
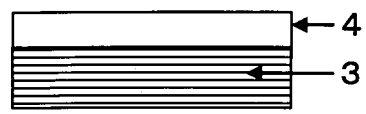
FIG. 8 is a schematic drawing showing a further other preferred mode of the molding material of this invention, as across sectional form in the axial center direction.
Figure 9:
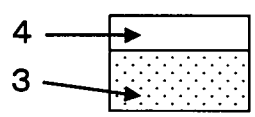
FIG. 9 is a schematic drawing showing the molding material of FIG. 8, as a cross sectional form in the direction perpendicular to the axial center direction.
Figure 10:
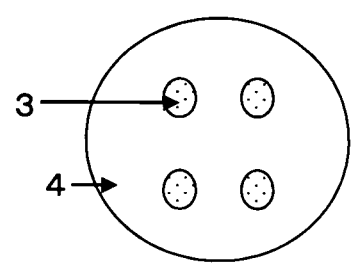
FIG. 10 is a schematic drawing showing a further other preferred mode of the molding material of this invention, as a cross sectional form in the direction perpendicular to the axial center direction.
Figure 11:
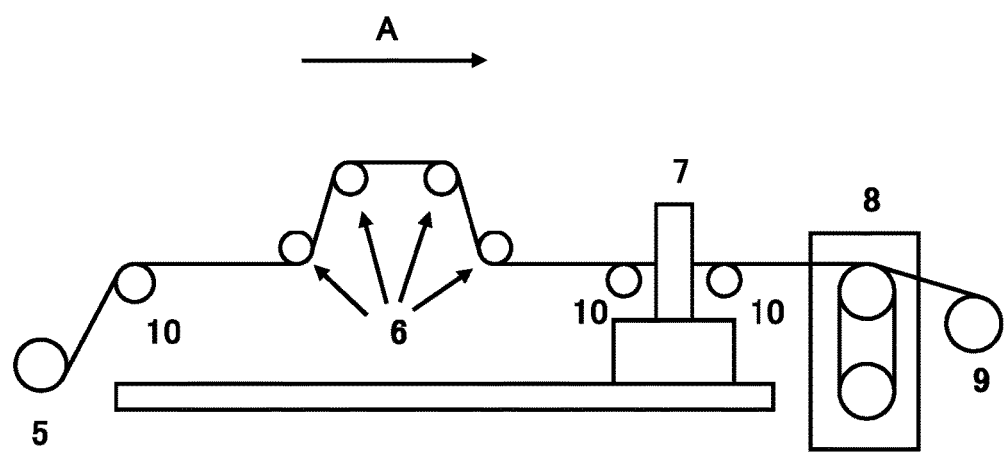
FIG. 11 is a schematic drawing showing the yarn passage used in the friction fluff evaluation method.

Further, as shown in the cross sectional views in the direction perpendicular to the axial center direction as FIGS. 3, 5, 7, preferred is a core-sheath structure wherein the resin-adhered reinforcing fiber bundle is arranged as the core surrounded by the third propylene-based resin (D). In the case where multiple resin-adhered reinforcing fiber bundles are arranged to be covered with the third propylene-based resin (D) as shown in FIG. 10, it is desirable that the number of resin-adhered reinforcing fiber bundles is 2 to approx. 6.

The resin-adhered reinforcing fiber bundle and the third propylene-based resin (D) are bonded to each other at the border, and the third propylene-based resin (D) may partially go into the resin-adhered reinforcing fiber bundle at near the border, to be compatible with the first propylene-based resin (B) and the second propylene-based resin (C) in the resin-adhered reinforcing fiber bundle or may be impregnated into the reinforcing fibers.

As the molding material of this invention, for example, the reinforcing fiber bundle (A), the first propylene-based resin (B), the second propylene-based resin (C) and the third propylene-based resin (D) are kneaded by such a method as injection molding or press molding, to produce a final molded article. In view of the handling properties of the molding material, it is important that the resin-adhered reinforcing fiber bundle and the third propylene-based resin (D) keep the form as described before, without being separated till molding is performed. The resin-adhered reinforcing fiber bundle and the third propylene-based resin (D) are quite different in form (size, aspect ratio), specific gravity and weight, and therefore when both the components are separated, they may be classified while the molding material is carried and handled before being molded and while the molding material is carried in the molding process. As a result, the molded article may become irregular in mechanical properties, or the molding material may decline in flowability to clog the mold or to cause blocking in the molding process as the case may be.

To prevent the separation between the resin-adhered reinforcing fiber bundle and the third propylene-based resin (D), it is preferred that the third propylene-based resin (D) is disposed to surround the resin-adhered reinforcing fiber bundle as shown in FIGS. 3, 5 and 7. That is, preferred is a core-sheath structure in which the resin-adhered reinforcing fiber bundle consisting of the reinforcing fiber bundle (A) as the reinforcing fibers, the first propylene-based resin (B) and the second propylene-based resin (C) forms a core while the third propylene-based resin (D) covers to surround the resin-adhered reinforcing fiber bundle. In this disposition, the resin-adhered reinforcing fiber bundle and the third propylene-based resin (D) can be compounded together more strongly.

As described before, it is desirable that the reinforcing fiber bundle (A) is perfectly impregnated with the first propylene-based resin (B), the second propylene-based resin (C) and the third propylene-based resin (D), but it is realistically difficult. The resin-adhered reinforcing fiber bundle has some voids. Especially when the content of the reinforcing fibers is large, the void volume is large, but even if voids exist to some extent, the effect of promoting the impregnation and fiber dispersion of this invention can be exhibited. However, if the void ratio of the resin-adhered reinforcing fiber bundle exceeds 20%, the effect of promoting the impregnation and fiber dispersion becomes small. Therefore, it is preferred that the void ratio is in a range from 0 to 20%. A more preferred void ratio range is 15% or less. The void ratio can be obtained by measuring the portion of the composite according to ASTM D2734 (1997) test method, or by observing the voids existing in the resin-adhered reinforcing fiber bundle portion on a cross section of the molding material, and calculating from the following formula using the total area of the resin-adhered reinforcing fiber bundle portion and the total area of the voids.

Void ratio (%)=Total area of voids/(Total area of composite portion+Total area of voids)×100

The molding material of this invention is cut at a length of preferably 1 to 50 mm. If the molding material is cut to have the aforementioned length, the flowability and handling properties at the time of molding can be sufficiently enhanced. An especially preferred mode of the molding material cut at such a length is long-fiber pellets to be injection-molded.

Further, the molding material of this invention can also be used as a continuous long material, depending on the molding method. For example, it can be wound around a mandrel as a thermoplastic yarn prepreg while being heated, to obtain a molded article like a roll. As an example of the molded article obtained like this is a liquefied natural gas tank, etc. Furthermore, multiple molding materials of this invention can also be paralleled in one direction and heated and fused to prepare a unidirectional thermoplastic prepreg. This prepreg can be used in a field requiring light weight, high strength, elastic modulus and impact resistance, for example, as an automobile member, etc.

The molding material of this invention can be processed into molded articles with final shapes by publicly known molding methods. The molding methods include press molding, transfer molding, injection molding, combinations thereof, etc.

In injection molding, since the molding material is kneaded at a certain temperature and certain pressure when it is plasticized, the first propylene-based resin (B) and the second propylene-based resin (C) exhibit large effects as dispersion and impregnation aids. In this case, an ordinary in-line screw type injection molding machine can be used. Even in the case where the kneading effect of the screw is weak like a screw shaped to have a low compression ratio or due to a low back pressure set when the material is plasticized, a molded article in which the reinforcing fibers are well dispersed in the matrix resin and are well impregnated with the resins can be obtained. Further, since the dispersibility of reinforcing fibers in the molding material of this invention is good, the breakage of the reinforcing fibers during kneading can be inhibited, and the mechanical strength of the molded article can be enhanced. That is, the pressure necessary for dispersing the reinforcing fibers during kneading can be kept low, and the kneading time is also short. Therefore, the breakage of the reinforcing fibers contained in the molded article can be inhibited for allowing the fibers to remain long, and as a result, the bending strength and impact resistance of the molded article can be enhanced.

The molded article is suitable for automobile parts like various modules such as instrument panels, door beams, under covers, lamp housings, pedal housings, radiator supports, spare tire covers and front ends. Further, the molded article can also be used for parts of household and office electric appliances such as telephone sets, facsimiles, VTRs, copiers, television sets, electronic ovens, acoustic devices, toiletries, laser discs, refrigerators and air conditioners. Furthermore, since the molding material of this invention is excellent in moldability, a molded article with a thin wall thickness of 0.5 to 2 mm can be relatively easily obtained. Molded articles required to have thin walls include the housings as used for laptop computers, cell phones, digital still cameras, PDAs, plasma displays, etc., and electric and electronic apparatus members typified by keyboard supports as members for supporting keyboards in personal computers. It is more preferred that the members of electric and electronic apparatuses use electroconductive carbon fibers as the reinforcing fibers, since the members can have electromagnetic wave shielding property.

In the resin-adhered reinforcing fiber bundle of this invention, a mixture containing the first propylene-based resin (B) and the second propylene-based resin (C) is adhered to the reinforcing fiber bundle (A).

In this case, it is important that the weight average molecular weight of the first propylene-based resin (B) is larger than the weight average molecular weight of the second propylene-based resin (C). The reason is that if the weight average molecular weight of the second propylene-based resin (C) is smaller than the weight average molecular weight of the first propylene-based resin (B), the second propylene-based resin (C) having carboxylate groups migrate nearer to the reinforcing fibers during molding, being likely to cause the interaction with the reinforcing fibers, thereby enhancing the adhesiveness between the reinforcing fibers and the resin.

In the resin-adhered reinforcing fiber bundle of this invention, another component than the propylene-based resins can also be adhered in addition to the propylene-based resins to such an extent that the effects of this invention are not impaired. For example, in the case where the propylene-based resins are applied to the reinforcing fiber bundle as an emulsion, a surfactant for stabilizing the emulsion or the like can also be added.

It is important that the amount of the mixture consisting of the first and second propylene-based resins adhered to the reinforcing fiber bundle is in a range from 0.1 to 30 parts by weight per 100 parts by weight of the reinforcing fiber bundle. If the adhered amount is less than 0.1 part by weight, the reinforcing fiber bundle may not be partially covered, and good adhesiveness may not be stably exhibited as the case may be. Further, the handling properties of the resin-adhered reinforcing fiber bundle may become insufficient as the case may be. The handling properties in this case mean the hardness of the resin-adhered reinforcing fiber bundle and the capability to handle the resin-adhered reinforcing fiber bundle when the resin-adhered reinforcing fiber bundle is wound around a bobbin. Further in the case where the resin-adhered reinforcing fiber bundle is cut to be used as a chopped fiber bundle, the handling properties include the integrity of the chopped fiber bundle. On the other hand, if the adhered amount is larger than 30 parts by weight, the mechanical properties of the molded article may extremely decline as the case may be, or the resin-adhered reinforcing fiber bundle may become too hard to be wound around a bobbin inconveniently as the case may be. In view of the balance between the adhesiveness and the handling properties of the resin-adhered reinforcing fiber bundle, it is preferred that the adhered amount is 1 to 20 parts by weight. A more preferred range is 3 to 10 parts by weight.

The method for adhering the mixture consisting of the first and second propylene-based resins to the reinforcing fiber bundle is not especially limited but in view of easily and uniformly adhering the mixture to the respective single fibers constituting the reinforcing fiber bundle, a method of applying an emulsion of the propylene-based resin mixture to the reinforcing fiber bundle and subsequently drying is preferred. The emulsion can be applied to the reinforcing fiber bundle by a conventional method such as a roller immersion method, roller transfer method or spray method.

The matrix resin used when the resin-adhered reinforcing fiber bundle of this invention is used to produce a molded article is not especially limited. Examples of the matrix resin include polycarbonate resins, styrene-based resins, polyamide resins, polyester resins, polyphenylene sulfide resins (PPS resins), modified polyphenylene ether resins (modified PPE resins), polyacetal resins (POM resins), liquid crystal polyesters, acrylic resins such as polyarylate and polymethyl methacrylate resins (PMMA), vinyl chloride, polyimides (PI), polyamideimides (PAI), polyetherimides (PEI), polysulfones, polyethersulfones, polyketones, polyetherketones, polyetheretherketones (PEEK), polyolefins such as polyethylene and polypropylene, modified polyolefins, and thermoplastic resins such as phenol resins and phenoxy resins. Further, ethylene-propylene copolymer, ethylene-1-butene copolymer, ethylene-propylene-diene copolymer, ethylene-carbon monoxide-diene copolymer, ethylene-ethyl(meth)acrylate copolymer, ethylene-glycidyl(meth)acrylate, ethylene-vinyl acetate-glycidyl(meth)acrylate copolymer, various elastomers such as polyether ester elastomer, polyether ether elastomer, polyether ester amide elastomer, polyester amide elastomer and polyester ester elastomer, etc. can also be used. Any one of them can be used alone or two or more of them can also be used together. Among them, especially a low-polar polyolefin-based resin is preferred. In view of the cost and light weight of the molded article, polypropylene or modified polypropylene resin, especially an acid-modified polypropylene resin is preferred.

With regard to the mixing ratio of the mixture consisting of the first propylene-based resin (B) and the second propylene-based resin (C), it is important to use 0.3 to 45 parts by weight of the second propylene-based resin (C) per 100 parts by weight of the first propylene-based resin (B). The reason is that if the mixing ratio is as described above, the strength of the mixture per se can be secured and the affinity with the reinforcing fibers can also be secured. It is preferred to use 1 to 35 parts by weight of the second propylene-based resin per 100 parts by weight of the first propylene-based resin (B), and it is more preferred to use 5 to 25 parts by weight of the second propylene-based resin per 100 parts by weight of the first propylene-based resin (B). It is further more preferred to use 7 to 20 parts by weight of the second propylene-based resin per 100 parts by weight of the first propylene-based resin (B). If the amount of the second propylene-based resin (C) is less than 0.3 part by weight, the affinity with the reinforcing fibers may not be able to be secured and the adhesiveness may become poor. Further, if the amount of the second propylene-based resin (C) is larger than 45 parts by weight, the strength of the mixture per se may decline as the case may be, and strong adhesiveness may not be able to be maintained.

With respect to the single fibers constituting the reinforcing fiber bundle, it is preferred for exhibiting stronger adhesiveness that 60% or more of the surfaces of the single fibers is covered with the mixture containing the first propylene-based resin (B) and the second propylene-based resin (C). The portions that are not covered cannot exhibit adhesiveness and become the points where peeling start, to lower the entire adhesiveness as a result. It is more preferred that 70% or more of the surfaces of the single fibers is covered, and it is further more preferred that 80% or more is covered. The covering state can be known by a method of observing the surface of the resin-adhered reinforcing fiber bundle using a scanning electron microscope (SEM) or a method of tracing the metal element of the carboxylate groups by performing elemental analysis on the surface, etc.

Further, in order to secure good handling properties and quality, it is preferred that the number of friction fluff pieces of the resin-adhered reinforcing fiber bundle of this invention measured by the friction fluff evaluation method described later is 10 or less per 1 m. It is preferably 8 or less per 1 m, more preferably 5 or less per 1 m. A small number of friction fluffs means that the fluffing of the resin-adhered reinforcing fiber bundle is small, and the quality of the resin-adhered reinforcing fiber bundle tends to be good.

Furthermore, it is preferred that the hook drop value as an indicator of handling properties of the resin-adhered reinforcing fiber bundle is in a range from 1 to 80 cm. The hook drop value is a parameter relating to the integrity of the fiber bundle and the hardness of the fiber bundle. If the hook drop value is larger, the fiber bundle tends to be low in integrity and soft. On the contrary, if the hook drop value is smaller, the fiber bundle is less likely to be loose, but tends to be hard. The method for measuring the hook drop value is as described later. A more preferred hook drop value range is 2 to 60 cm, and a further more preferred range is 3 to 40 cm.

A preferred form of the resin-adhered reinforcing fiber bundle of this invention is a chopped yarn obtained by cutting a roving consisting of long fibers at a predetermined length or a milled yarn. In view of handling properties, a chopped yarn can be preferably used. The length of the fibers in the chopped yarn is not especially limited, but in view of sufficiently exhibiting the integrity, sufficiently maintaining the form obtained by cutting and handling convenience, a range from 1 to 30 mm is preferred. A more preferred range is 2 to 15 mm. If the integrity of the chopped yarn is insufficient, the friction occurring during transport or the like causes fluffing, and fiber balls formed may impair the handling properties as the case may be. Further, when the fiber bundle is compounded for any application, the fire balls formed lowers the capability of supplying the chopped yarn to the extruder, and productivity may decline. An indicator of the integrity is the bulk density of the chopped yarn. The bulk density can be obtained by packing a container with a certain weight of a chopped yarn, obtaining the occupied volume, and dividing the weight by the volume.

The molding method using the resin-adhered reinforcing fiber bundle of this invention is not especially limited. There are (1) a molding method in which compound pellets obtained by melt-kneading the resin-adhered reinforcing fiber bundle of this invention and a matrix resin are used as the molding material, (2) a direct molding method in which a mixture consisting of the resin-adhered reinforcing fiber bundle and matrix resin pellets is directly supplied into a molding machine or the resin-adhered reinforcing fiber bundle and matrix resin pellets are individually directly supplied into a molding machine, to be cast into a mold, then being cooled and solidified, (3) a molding method in which long-fiber pellets obtained by covering the resin-adhered reinforcing fiber bundle with a matrix resin are used, etc.

The resin-adhered reinforcing fiber bundle of this invention can be developed for various applications. It is especially suitable for automobile parts like various modules such as instrumental panels, door beams, under covers, lamp housings, pedal housings, radiator supports, spare tire covers and front ends; parts of electric and electronic apparatuses such as laptop computers, cell phones, digital still cameras, PDAs and plasma displays; and parts of household and office electric appliances such as telephone sets, facsimiles, VTRs, copiers, television sets, electronic ovens, acoustic devices, toiletries, laser discs, refrigerators and air conditioners.

EXAMPLES

This invention is explained below in more detail in reference to examples.

(1) Measurement of the Weight Average Molecular Weight of a Propylene-based Resin The weight average molecular weight of the first propylene-based resin (B), second propylene-based resin (C) or third propylene-based resin (D) was measured by gel permeation chromatography (GPC). As the GPC column, a column packed with crosslinked polystyrene gel was used. As the solvent, 1,2,4-trichlorobenzene was used. Measurement was performed at 150° C. The molecular weight was calculated in terms of standard polystyrene.

(2) Structural Analysis of a Propylene-based Resin

For each of the first, second and third propylene-based resins, the elemental analysis of the organic compound, inductively coupled plasma (ICP) optical emission spectrometry, IR (infrared absorption) spectroscopy, $^1$H-NMR measurement and $^{13}$C-NMR measurement were performed, to measure the amounts of the elements contained in the propylene-based resin, to identify the functional group structure and to evaluate the content ratio of the monomer structure in reference to the intensities of respective peaks ascribed of $^1$H-NMR and $^{13}$C-NMR.

The elemental analysis of an organic compound was performed using organic element analyzer 2400II (produced by Perkin Elmer). The ICP optical emission spectrometry was performed using ICPS-7510 (produced by Shimadzu Corporation). The IR spectroscopy was performed using IR-Prestige-21 (produced by Shimadzu Corporation). $^1$H-NMR measurement and $^{13}$C-NMR measurement were performed using JEOL JNM-GX400 Spectrometer (produced by JEOL, Ltd.).

(3) Void Ratio of a Resin-adhered Reinforcing Fiber Bundle

The void ratio (%) of a resin-adhered reinforcing fiber bundle was calculated according to ASTM D2734 (1997) test method.

The void ratio was evaluated according to the following criterion. A to C were acceptable.
A: 0 to less than 5%
B: 5% to less than 20%
C: 20% to less than 40%
D: 40% or more (4) Fiber Dispersibility in Obtained Molded Articles A molding material was used to produce molded articles of 100 mm×100 mm×2 mm. The number of non-dispersed CF bundles existing on the front surfaces and the back surfaces of the molded articles was visually counted. For evaluation, 50 molded articles were used, and the total number of CF bundles was evaluated as fiber dispersibility according to the following criterion. A to C were acceptable.
A: One non-dispersed CF bundle or less
B: One to less than five non-dispersed CF bundles
C: Five to less than 10 non-dispersed CF bundles
D: Ten or more non-dispersed CF bundles (5) Bending Test of an Obtained Molded Article A molding material was molded to produce specimens specified in ASTM D790 (1997), and according to ASTM D790 (1997), the bending strength and the bending modulus of elasticity were measured using a three-point bending test fixture (presser 10 mm, fulcrum 10 mm) with the support span set at 100 mm at a crosshead speed of 5.3 mm/min. As the tester, "Instron" (registered trademark) type universal tester 4201 (produced by Instron) was used.

The bending strength was evaluated according to the following criterion. A to C were acceptable.
A: 150 MPa or more
B: 130 MPa to less than 150 MPa
C: 100 MPa to less than 130 MPa
D: Less than 100 MPa (6) Izod Impact Test of an Obtained Molded Article A molding material was used to produce specimens specified in ASTM D256 (1993), and according to ASTM D256 (1993), notched Izod impact test was performed. A specimen with a thickness of 3.2 mm and a water content of 0.1 wt % or less was used to measure the Izod impact strength (J/m).

The Izod impact test result was evaluated according to the following criterion. A to C were acceptable.
A: 250 J/m or more
B: 200 J/m to less than 250 J/m
C: 150 J/m to less than 200 J/m
D: Less than 150 J/m (7) Measurement of the Amount of the Propylene-based Resins adhered to a reinforcing fiber bundle Approx. 5 g of a propylene-based resin-adhered reinforcing fiber bundle was taken and dried at 120° C. for 3 hours, and the weight $W_1$ (g) of the resin-adhered reinforcing fiber bundle was measured. Then, the resin-adhered reinforcing fiber bundle was heated at 450° C. in nitrogen atmosphere for 15 minutes, and the propylene-based resins were removed. The residue was cooled to room temperature and the weight $W_2$ (g) of the remaining reinforcing fiber bundle was measured. The adhered amount of the propylene-based resins per 100 parts by weight of the reinforcing fiber bundle was calculated from the following formula.

$$\text{Adhered amount} = [(W_1 - W_2)/W_2] \times 100 \text{ (parts by weight)}$$

(8) Measurement of the Carboxylate Group Content of a Propylene-based Resin

A propylene-based resin was processed as described below to measure the content of the carboxylate groups and the content of the carboxylic acid groups not neutralized.

Zero point five gram of a propylene-based resin was heated and refluxed in 200 ml of toluene, to be dissolved. The solution was titrated with 0.1N potassium hydroxide-ethanol standard solution, and the acid value was calculated from the following formula. Phenolphthalein was used as the indicator $$\text{Acid value} = (5.611 \times A \times F)/B \text{ (mg KOH/g)}$$

A: Amount of 0.1N potassium hydroxide-ethanol standard solution used (ml)
F: Factor of 0.1N potassium hydroxide-ethanol standard solution (1.02)
B: Amount of sample (0.50 g)

The acid value calculated in the above was used to calculate the number of moles of the carboxylic acid groups not neutralized from the following formula.

$$\text{Number of moles of the carboxylic acid groups not neutralized} = \text{Acid value} \times 1{,}000/56 \text{ (moles/g)}$$

The conversion ratio of the carboxylic acid groups into the neutralized salt was calculated from the following formula using the total number of moles (moles/g) of carboxylic acid groups and carboxylate groups calculated by determining the carbonyl carbon using IR, NMR, elemental analysis, etc.

$$\text{Conversion ratio \%} = (1-r) \times 100 \,(\%)$$

r: Number of moles of the carboxylic acid groups not neutralized/Total number of moles of carboxylic acid groups and carboxylate groups (9) Ratio of Covering the Surfaces of Fibers with Propylene-based Resins A propylene-based resin-adhered reinforcing fiber bundle was observed using a scanning electron microscope, and the fiber surface covering ratio was calculated from the area ratio of the resin covering portion and the reinforcing fiber surface exposed portion. Arbitrary five regions, each with a length of 10 times the single fiber diameter in the fiber axis direction of the reinforcing fiber bundle, were selected for observation. Five single fibers were arbitrarily selected and observed in each of the arbitrary five regions. The average of 25 regions in total was employed as the fiber surface covering ratio.

Fiber surface covering ratio=Resin covering portion/
(Resin covering portion+Reinforcing fiber surface exposed portion)

(10) Measurement of the Number of Friction Fluff Pieces

A bobbin of a resin-adhered reinforcing fiber bundle as an evaluation sample was allowed to stand in a temperature controlled chamber controlled at temperature 23±5° C. and relative humidity 60±20% for 30 minutes or more. Then, a friction fluff device in a temperature controlled chamber set at the same temperature and humidity was used to measure the number of friction fluff pieces of the resin-adhered reinforcing fiber bundle. At first, according to the yarn passage drawing shown in FIG. 12, the resin-adhered reinforcing fiber bundle was set on a creel (5) containing a powder clutch, to establish a yarn passage. For generating friction fluff, the resin-adhered reinforcing fibers were hooked along fixed four friction pins (6) with a diameter of 10 mm and mirror-finished on the surfaces and passed through a fluff counter (7). Lest the fibers should slip during running, the resin-adhered reinforcing fibers were wound around the drive rollers (8) five times or more and wound around a winder (9). The yarn speed was set at 3 m/min, and as shown in FIG. 12, the resin-adhered reinforcing fibers were started to run along the yarn passage on rollers (10) installed at respective places. After it was confirmed that the yarn passage was stabilized, the powder clutch was used to adjust the initial tension to ensure that the tension of the running resin-adhered reinforcing fibers at a place between the fluff counter (7) and the drive rollers (8) might be 6 gf/tex. Then, the fluff counter was actuated to measure the number of fluff pieces while the fibers were kept running. For each sample, measurement for 1 minute was performed 3 times, and using the respective numbers of fluff pieces X1, X2 and X3 counted in each one minute, the number of friction fluff pieces (pieces/m) was calculated from the following formula.

$X=(X1+X2+X3)/9$

The number of friction fluff pieces was evaluated according to the following criterion. A to C were acceptable.
A: 0 to 2 pieces/m
B: 3 to 5 pieces/m
C: 6 to 10 pieces/m
D: 11 pieces/m or more
(11) Evaluation of the Processability of a Resin-adhered Reinforcing Fiber Bundle (Measurement of Hook Drop Value)

A resin-adhered reinforcing fiber bundle was allowed to stand in an atmosphere of temperature 23±2° C. and humidity 50±5% for 2 hours. The resin-adhered reinforcing fiber bundle was cut at a length of 1.5 m, and a load of 100 g was attached at the bottom of the fiber bundle and suspended vertically. A stainless steel wire with a diameter of 1 mm and a length of approx. 100 mm was bent at the top and bottom thereof respectively by 20 to 30 mm. A load was applied to the bottom of the stainless steel wire in order to make a total weight of 12 g, and the U-shaped portion at the top was hooked on the fiber bundle at the center in the width direction. After lapse of 30 minutes, the falling distance (in cm) of the loaded stainless steel wire was measured. Measurement was performed at least five times, and the average value was employed as the hook drop value. Processability was evaluated according to the following criterion. A and B were acceptable.

A: Hook drop value in a range from 3 cm to less than 40 cm.
B: Hook drop value is in a range from 1 cm to less than 3 cm or in a range from 40 cm to 80 cm.
C: Hook drop value is less than 1 cm or more than 80 cm.
(12) Evaluation of the Bulk Density of a Chopped Resin-adhered Reinforcing Fiber Bundle Thirty grams of a chopped resin-adhered reinforcing fiber bundle was placed in a 500 ml measuring cylinder, and the measuring cylinder was dropped from a height of 2 cm onto a rubber sheet 50 times, for tapping, to sufficiently pack the cylinder with the chopped resin-adhered reinforcing fiber bundle. After completion of packing, the volume was read, to calculate the bulk density of the chopped resin-adhered reinforcing fiber bundle from the following formula.

Bulk density of a chopped resin-adhered reinforcing fiber bundle=30 (g)/Volume after completion of packing (ml)

The bulk density was evaluated according to the following criterion. A to C were acceptable.
A: 0.4 g/ml or more
B: 0.3 g/ml to less than 0.4 g/ml
C: 0.2 g/ml to less than 0.3 g/ml
D: Less than 0.2 g/ml
(13) Evaluation of Interface Shear Strength For the detail of evaluation, refer to Drzal, L. T., Mater. Sci. Eng. A126, 289 (1990). One single fiber with a length of 20 cm was taken out of a propylene-based resin-adhered reinforcing fiber bundle. In succession, two 20×20 cm square films, each with a film thickness of 150 μm, of a resin composed of 50 wt % of unmodified polypropylene resin ("Prime Polypro (registered trademark)" J105G produced by Prime Polymer Co., Ltd.) and 50 wt % of an acid-modified polypropylene resin ("Admer (registered trademark)" GB510 produced by Mitsui Chemicals, Inc.) were prepared, and the aforementioned single fiber taken out was disposed on one of the resin films as a straight line. The other resin film was overlaid to keep the single fiber between the resin films, and pressed at a pressure of 0.5 MPa at 200° C. for 3 minutes, to prepare a sample with the single fiber embedded in the resin. The obtained sample was cut to obtain a 0.2 mm thick, 10 mm wide and 70 mm long specimen with the single fiber buried at the center. In the same way as described above, ten specimens were prepared.

One of the specimens was tested at a test length of 25 mm using an ordinary tensile test fixture at a strain rate of 0.5 mm/min. When the reinforcing fiber was not broken any more, the average broken fiber length (1) was measured using a transmission microscope.

The interface shear strength (τ) was obtained from the following formula.

$\tau = (\sigma f \cdot d)/(2 \cdot lc)$ $lc = (4/3) \cdot l$ where l (μm) is the average value of the final broken fiber lengths; σf (MPa) is the tensile strength of the fibers; and d (μm) is the diameter of the fibers. The tensile strength of was obtained by the following method on the assumption that the tensile strength distribution of the reinforcing fibers followed the Weibull distribution. That is, the single fibers not yet impregnated with the propylene-based resins were used, and the tensile strengths of the single fibers respectively with sample lengths of 5, 25 and 50 mm were obtained on the basis of JIS R 7606. Particularly, a carbon fiber bundle was divided into approximately tetrasected, and from the four divided bundles, 100 single fibers each were sampled in succession. In this case, the samples were selected as impartially as possible from each divided bundle as a whole. The sampled single fibers were fixed onto a perforated mount using an adhesive. The mount having the single fibers fixed thereon was attached to a tensile tester, and a tensile test was performed at a strain rate of 1 mm/min using 100 single fiber samples. From the obtained average tensile strengths, the relational formula between sample lengths and average tensile strengths was obtained by a least square method, and the average tensile strength at a sample length of 1c was calculated.

The interface shear strength was evaluated according to the following criterion. A to D were acceptable.
A: 16 MPa or more
B: 14 MPa to less than 16 MPa
C: 12 MPa to less than 14 MPa
D: 10 MPa to less than 12 MPa
E: Less than 10 MPa The materials used in the following working examples are described below as reference examples.

Reference Example 1

Carbon fibers 1

A copolymer with polyacrylonitrile as the main component was spun, and subsequently the fibers were treated by burning and treated by oxidation on the surfaces, to obtain 24,000 continuous carbon fibers as single fibers. The continuous carbon fibers had the following properties.
Single fiber diameter: 7
Mass per unit length: 1.6 g/m
Specific gravity: 1.8
Surface oxygen concentration ratio [O/C]: 0.06
Tensile strength: 4,600 MPa.
Tensile modulus of elasticity: 220 GPa.

Among the above items, the surface oxygen concentration ratio was obtained using the carbon fibers treated by oxidation on the surfaces thereof according to the following procedure by X-ray photoelectron spectroscopy. At first, the carbon fiber bundle was cut at 20 mm, and spread on a sample support base made of copper, and using AlKα1,2 as the X-ray source, the sample chamber was internally kept at 1×10$^8$ Torr. As the correction value of the peak for the electrification at the time of measurement, the kinetic energy value (K.E.) of the main peak of $C_{1s}$ was adjusted to 1,202 eV. In a K.E. range from 1,191 to 1,205 eV, a straight base line was drawn to obtain $C_{1s}$ peak area. Further, in a K.E. range from 947 to 959 eV, a straight base line was drawn to obtain $O_{1s}$ peak area. From the ratio of the $O_{1s}$ peak area to the $C_{1s}$ peak area obtained as described above, the surface oxygen concentration ratio [O/C] was calculated as atom number ratio using the sensitivity correction value peculiar to the instrument. As the X-ray photoelectron spectroscope, Model ES-200 produced by Kokusai Denki was used, and 1.74 was used as the sensitivity correction value.

Reference Example 2

Carbon fibers 2

A copolymer with polyacrylonitrile as the main component was spun, and subsequently the fibers were treated by burning and treated by oxidation on the surfaces, to obtain 24,000 continuous carbon fibers as single fibers. The continuous carbon fibers had the following properties.
Single fiber diameter: 7 μm
Mass per unit weight: 1.6 g/m
Specific gravity: 1.8
Surface oxygen concentration ratio [O/C]: 0.12
Tensile strength: 4,600 MPa
Tensile modulus of elasticity: 220 GPa Reference Example 3

Preparation of Propylene-based Resin Mixture PP (1)

Ninety one parts by weight of propylene-butene-ethylene copolymer (b-1) (building blocks derived from propylene (hereinafter referred to also as "C3")=66 mol %, Mw=90,000) as the first propylene-based resin (B), 9 parts by weight of maleic anhydride-modified propylene-ethylene copolymer (C3=98 mol %, Mw=25,000, acid content=0.81 millimole equivalent) as a precursor of the second propylene-based resin (C) and 3 parts by weight of potassium oleate as a surfactant were mixed. The mixture was supplied into the hopper of a twin-screw extruder (PCM-30 produced by Ikegai Tekko K.K., L/D=40) at a rate of 3,000 g/hour, and 20% potassium hydroxide aqueous solution was continuously supplied into the supply port provided at the vent of the extruder at a rate of 90 g/hour, while the resin mixture was continuously extruded at a heating temperature of 210° C. The extruded resin mixture was cooled to 110° C. by a jacketed static mixer installed at the outlet of the extruder, and was further supplied into hot water of 80° C., to obtain an emulsion. The carboxylic acid of the second propylene-based resin (C) became a potassium salt, and the functional group conversion ratio was 100% (c-1). The solid concentration of the obtained emulsion was 45%.

Meanwhile, the abovementioned maleic anhydride-modified propylene-ethylene copolymer was obtained by mixing 96 parts by weight of propylene-ethylene copolymer, 4 parts by weight of maleic anhydride and 0.4 part by weight of Perhexine 25B (produced by NOF Corporation) as a polymerization initiator, and modifying at a heating temperature of 160° C. for 2 hours.

Reference Example 4

Preparation of Propylene-based Resin Mixture PP (2)

An emulsion was produced as described in Reference Example 3, except that maleic anhydride-modified propylene-ethylene polymer (C3=98 mol %, Mw=5,000, acid content=0.81 millimole equivalent) was used as a precursor of the second propylene-based resin (C). The carboxylic acid of the second propylene-based resin (C) became a potassium salt, and the functional group conversion ratio was 100% (c-2). The solid concentration of the emulsion was 45 wt %.

Reference Example 5

Preparation of Propylene-based Resin Mixture PP (3)

An emulsion was produced as described in Reference Example 3, except that maleic anhydride-modified propylene-ethylene polymer (C3=95 mol %, Mw=25,000, acid content=0.1 millimole equivalent) was used as a precursor of the second propylene-based resin. The carboxylic acid of the second propylene-based resin (C) became a potassium salt, and the functional group conversion ratio was 100% (c-3). The solid concentration of the emulsion was 45 wt %.

Reference Example 6

Preparation of Propylene-based Resin Mixture PP (4)

An emulsion was produced as described in Reference Example 3, except that the supply rate of 20% potassium hydroxide aqueous solution was changed from 90 g/hour to 43 g/hour. The functional group conversion ratio of the second propylene-based resin (C) was 70% (c-4). The solid concentration of the emulsion was 45 wt %.

Reference Example 7

Preparation of Propylene-based Resin Mixture PP (5)

An emulsion was produced as described in Reference Example 3, except that 20% ammonia water was used instead of 20% potassium hydroxide aqueous solution and that the supply rate was changed from 90 g/hour to 150 g/hour. The carboxylic acid of the second propylene-based resin (C) became an ammonium salt, and the functional group conversion ratio was 100% (c-5). The solid concentration of the emulsion was 45 wt %.

Reference Example 8

Preparation of Propylene-based Resin Mixture PP (6)

An emulsion was produced as described in Reference Example 3, except that maleic anhydride-modified propylene-ethylene polymer (C3=95 mol %, Mw=40,000, acid content=0.81 millimole equivalent) was used as a precursor of the second propylene-based resin (C). The carboxylic acid of the second propylene-based resin (C) became a potassium salt, and the functional group conversion ratio was 100% (c-6). The solid concentration of the emulsion was 45 wt %.

Reference Example 9

Preparation of Propylene-based Resin Mixture PP (7)

An emulsion was produced as described in Reference Example 3, except that a mixed resin consisting of 45.5 parts by weight of propylene-butene-ethylene copolymer (b-1) (C3=66 mol %, Mw=90,000) and 45.5 parts by weight of propylene-butene copolymer (b-2) (C3=81 mol %, Mw=300,000) was used as the first propylene-based resin (B). The solid concentration of the emulsion was 45 wt %.

Reference Example 10

Preparation of Propylene-based Resin Mixture PP (8)

An emulsion was prepared as described in Reference Example 3, except that maleic anhydride-modified propylene-butene-ethylene copolymer (b-3) (C3=66 mol %, Mw=70,000, acid content=0.81 millimole equivalent) was used as the first propylene-based resin (B). The solid concentration of the emulsion was 45 wt %.

Reference Example 11

Preparation of Propylene-based Resin Mixture PP (9)

Unmodified polypropylene resin (weight average molecular weight 100,000) was ground to obtain a polypropylene resin powder with an average particle diameter of 10 µm. The powder was added into n-hexane, and the mixture was stirred to prepare an unmodified polypropylene resin suspension. The solid concentration was 45%.

Reference Example 12

Preparation of Propylene-based Resin Mixture PP (10)

An emulsion was produced as described in Reference Example 3, except that maleic anhydride-modified propylene-ethylene copolymer (b-4) (C3=98 mol %, Mw=25,000, acid content=0.81 millimole equivalent) used as a precursor of the second propylene-based resin (C) was used as the first propylene-based resin (B). The solid concentration of the emulsion was 45 wt %.

Reference Example 13

Preparation of Propylene-based Resin Mixture PP (11)

An emulsion was produced as described in Reference Example 3, except that maleic anhydride-modified propylene-ethylene polymer (C3=95 mol %, Mw=200,000, acid content=0.81 millimole equivalent) was used as a precursor of the second propylene-based resin (C). The carboxylic acid of the second propylene-based resin (C) became a potassium salt, and the functional group conversion ratio was 100% (c-7). The solid concentration of the emulsion was 45 wt %.

Reference Example 14

Preparation of Propylene-based Resin Mixture PP (12)

An emulsion was produced as described in Reference Example 3, except that the amount of the first propylene-based resin (B) was 50 parts by weight and that the amount of the precursor of the second propylene-based resin (C) was 50 parts by weight. The concentration of the emulsion was 45 wt %.

Reference Example 15

Synthesis of an Acid-Modified Propylene Resin Used as the Third Propylene-Based Resin (D)

Ninety nine point six parts by weight of propylene polymer, 0.4 part by weight of maleic anhydride and 0.4 part by weight of Perhexine 25B (produced by NOF Corporation) as a polymerization initiator were mixed, and modified at a heating temperature of 160° C. for 2 hours, to obtain acid-modified polypropylene resin (d-2) (Mw=400,000, acid content=0.08 millimole equivalent).

Reference Example 16

Preparation of Propylene-based Resin Mixture PP (13)

An emulsion was produced as described in Reference Example 3, except that 20% zinc hydroxide aqueous solution was used instead of 20% potassium hydroxide aqueous solution and that the supply rate was changed from 90 g/hour to 160 g/hour. The carboxylic acid of the second propylene-based resin (C) became a zinc salt, and the functional group conversion ratio was 100% (c-8). The solid concentration of the emulsion was 45 wt %.

Reference Example 17

Preparation of Propylene-based Resin Mixture PP (14)

An emulsion was prepared as described in Reference Example 3, except that the amount of the first propylene-based resin (B) was 40 parts by weight and that the amount of the precursor of the second propylene-based resin (C) was 60 parts by weight. The solid concentration of the emulsion was 45 wt %.

Working Example 1

The emulsion of the propylene-based resin mixture PP (1) produced in Reference Example 3 was adjusted to a solid concentration of 27 wt %, and the adjusted emulsion was adhered to the continuous carbon fiber bundle obtained in Reference Example 1. Then, the resin-adhered fiber bundle was dried online at 210° C. for 2 minutes, to remove water, thereby obtaining a composite consisting of the carbon fiber bundle (A), the first propylene-based resin (B) and the second propylene-based resin. The properties of the obtained composite are shown in Table 1. The amount of the propylene-based resin mixture PP (1) adhered to 100 parts by weight of the carbon fiber bundle was 20 parts by weight.

Then, as the third polypropylene resin (D), Prime Polypro J105G resin (d-1) produced by Prime Polymer Co., Ltd. was molten at 200° C. in a single-screw extruder and supplied into the crosshead die attached at the tip of the extruder, while, at the same time, the strand of the composite consisting of the components (A), (B) and (C) obtained in the above was also continuously supplied into the abovementioned crosshead die, to cover the composite consisting of the components (A), (B) and (C) with the molten component (D). In this case, the amount of the component (D) was adjusted to ensure that the reinforcing fiber content might be 20 wt %.

The strand obtained by the abovementioned method was cooled and cut at a length of 7 mm using a cutter, to obtain columnar pellets (long-fiber pellets) with a core-sheath structure. A cross section of the pellets was observed using a microscope, and was confirmed to have the core-sheath structure shown in FIG. 5.

The obtained long-fiber pellets were free from the fluffing caused by transport and showed good handling properties. The long-fiber pellets were dried at 80° C. in vacuum for more than 5 hours, and molded using J150EII-P injection molding machine produced by The Japan Steel Works, Ltd. and using molds for respective specimens. Conditions were 210° C. as the cylinder temperature, 60° C. as the mold temperature and 30 seconds as cooling time. After completion of molding, the specimens were dried at 80° C. in vacuum for 12 hours and stored in a desiccator of room temperature for 3 hours, and the dry specimens were evaluated. The average fiber length of the carbon fibers in the obtained specimens was 0.8 mm. Property evaluation results are stated in Table 1.

Meanwhile, the average fiber length of the carbon fibers in the specimens was obtained as described below. A small piece of a molded article was heat-treated in an electric furnace at 500° C. for 60 minutes, to decompose and volatilize the resin. From the remaining reinforcing fibers, approximately 100 fibers were sampled at random, and the lengths were measured using a microscope. The mean value of the measured lengths was employed as the average fiber length.

Working Example 2

Long-fiber pellets were obtained, molded and evaluated as described in Working Example 1, except that a mixture consisting of 50 wt % of Prime Polypro J105G resin (d-1) produced by Prime Polymer Co., Ltd. and 50 wt % of the acid-modified propylene-based resin (d-2) produced in Reference Example 15 was used as the third propylene-based resin (D). Property evaluation results are stated in Table 1.

Working Example 3

Long-fiber pellets were obtained, molded and evaluated as described in Working Example 2, except that the emulsion of the propylene-based resin mixture PP (1) was adjusted to a solid concentration of 10 wt %, to be used. Property evaluation results are stated in Table 1.

Working Example 4

Long-fiber pellets were obtained, molded and evaluated as described in Working Example 2, except that the emulsion of the propylene-based resin mixture PP (1) was adjusted to a solid concentration of 45 wt %, to be used. Property evaluation results are stated in Table 1.

Working Example 5

Long-fiber pellets were obtained, molded and evaluated as described in Working Example 2, except that the emulsion of the propylene-based resin mixture PP (12) produced in Reference Example 14 was adjusted to a solid concentration of 35%, to be used. Property evaluation results are stated in Table 1.

Working Example 6

Long-fiber pellets were obtained, molded and evaluated as described in Working Example 2, except that the emulsion of the propylene-based resin mixture PP (2) produced in Reference Example 4 was adjusted to a solid concentration of 27 wt %, to be used. Property evaluation results are stated in Table 2.

Working Example 7

Long-fiber pellets were obtained, molded and evaluated as described in Working Example 2, except that the carbon fiber bundle was impregnated with 15 wt % of "Clearon" K110 (hydrogenated terpene-based resin) produced by Yasuhara Chemical Co., Ltd. and subsequently covered with polypropylene resin using an extruder. Property evaluation results are stated in Table 2.

Working Example 8

Long-fiber pellets were obtained, molded and evaluated as described in Working Example 2, except that the emulsion of the propylene-based resin mixture PP (3) produced in Reference Example 5 was used. Property evaluation results are shown in Table 2.

Working Example 9

Long-fiber pellets were obtained, molded and evaluated as described in Working Example 2, except that the emulsion of the propylene-based resin mixture PP (4) produced in Reference Example 6 was used. Property evaluation results are stated in Table 2.

Working Example 10

Long-fiber pellets were obtained, molded and evaluated as described in Working Example 2, except that the emulsion of the propylene-based resin mixture PP (5) produced in Reference Example 7 was used. Property evaluation results are stated in Table 2.

Working Example 11

Long-fiber pellets were obtained, molded and evaluated as described in Working Example 2, except that the emulsion of the propylene-based resin mixture PP (6) produced in Reference Example 8 was used. Property evaluation results are stated in Table 3.

Working Example 12

Long-fiber pellets were obtained, molded and evaluated as described in Working Example 2, except that the emulsion of the propylene-based resin mixture PP (7) produced in Reference example 9 was used. Property evaluation results are stated in Table 3.

Working Example 13

Long-fiber pellets were obtained, molded and evaluated as described in Working Example 2, except that the emulsion of the propylene-based resin mixture PP (8) produced in Reference Example 10 was used. Property evaluation results are stated in Table 3.

Working Example 14

Long-fiber pellets were obtained, molded and evaluated as described in Working Example 2, except that the continuous carbon fibers obtained in Reference Example 2 were used. Property evaluation results are stated in Table 3.

Working Example 15

Long-fiber pellets were obtained, molded and evaluated as described in Working Example 2, except that the carbon fiber bundle was twisted 5 times per 10 cm and subsequently impregnated with the emulsion of the propylene-based resin mixture PP (1) by a roller impregnation method. Property evaluation results are stated in Table 3.

Comparative Example 1

The continuous carbon fiber bundle obtained in Reference Example 1 was evaluated as described in Working Example 2 without allowing the carbon fiber bundle to be impregnated with a propylene-based resin mixture. When long-fiber pellets were produced, the carbon fibers were fluffed, and no further process could be pursued.

Comparative Example 2

Long-fiber pellets were obtained, molded and evaluated as described in Working Example 2, except that the carbon fiber bundle was impregnated with the emulsion of the propylene-based resin mixture (1) by a roller impregnation method and again impregnated with the emulsion of the same concentration by a roller impregnation method. Property evaluation results are stated in Table 4.

Comparative Example 3

Long-fiber pellets were obtained, molded and evaluated as described in Working Example 2, except that the suspension of the propylene-based resin mixture PP (9) produced in Reference Example 11 was used. Property evaluation results are stated in Table 4.

Comparative Example 4

Long-fiber pellets were obtained, molded and evaluated as described in Working Example 2, except that the emulsion of the propylene-based resin mixture PP (10) produced in Reference Example 12 was used. Property evaluation results are stated in Table 4.

Comparative Example 5

Long-fiber pellets were obtained, molded and evaluated as described in Working Example 2, except that the emulsion of the propylene-based resin mixture PP (11) produced in Reference Example 13 was used. Property evaluation results are stated in Table 4.

TABLE 1

|  |  |  | Working Example 1 | Working Example 2 | Working Example 3 | Working Example 4 | Working Example 5 |
|---|---|---|---|---|---|---|---|
| Reinforcing fiber bundle (A) |  |  | Carbon fibers | Carbon fibers | Carbon fibers | Carbon fibers | Carbon fibers |
|  | Surface oxygen concentration (O/C) | — | 0.06 | 0.06 | 0.06 | 0.06 | 0.06 |
|  | Number of single fibers | pieces | 24,000 | 24,000 | 24,000 | 24,000 | 24,000 |
|  | Mixed amount | wt % | 20 | 20 | 20 | 20 | 20 |

TABLE 1-continued

|  |  |  | Working Example 1 | Working Example 2 | Working Example 3 | Working Example 4 | Working Example 5 |
|---|---|---|---|---|---|---|---|
| Mixture of propylene-based resins (B) and (C) |  |  | PP (1) | PP (1) | PP (1) | PP (1) | PP (12) |
| First propylene-based resin (B) | Type | — | b-1 | b-1 | b-1 | b-1 | b-1 |
|  | Mw | — | 90,000 | 90,000 | 90,000 | 90,000 | 90,000 |
|  | Functional groups |  | — | — | — | — | — |
|  | Amount of functional groups | millimole equivalent | — | — | — | — | — |
|  | Mixed amount | wt % | 3.6 | 3.6 | 1.1 | 7 | 5 |
| Second propylene-based resin (C) | Type |  | c-1 | c-1 | c-1 | c-1 | c-1 |
|  | Mw | — | 25,000 | 25,000 | 25,000 | 25,000 | 25,000 |
|  | Functional groups |  | COOK | COOK | COOK | COOK | COOK |
|  | Functional group conversion ratio | % | 100 | 100 | 100 | 100 | 100 |
|  | Amount of functional groups | millimole equivalent | 0.81 | 0.81 | 0.81 | 0.81 | 0.81 |
|  | Mixed amount | wt % | 0.4 | 0.4 | 0.1 | 0.7 | 5 |
| Third propylene-based resin (D) | Type |  | d-1 (100%) | d-1 (50%) d-2 (50%) | d-1 (50%) d-2 (50%) | d-1 (50%) d-2 (50%) | d-1 (50%) d-2 (50%) |
|  | Functional groups |  | — | Maleic anhydride | Maleic anhydride | Maleic anhydride | Maleic anhydride |
|  | Amount of functional groups | millimole equivalent | 0.5 | 0.5 | 0.5 | 0.5 | 0.5 |
|  | Mixed amount | wt % | 76 | 76 | 78.8 | 72.3 | 70 |
| Other component (E) | Type |  | — | — | — | — | — |
|  | Mixed amount | wt % | — | — | — | — | — |
| Void ratio of composite |  | % | B | B | C | A | A |
| Mode of molding material |  | — | Core-sheath long-fiber pellets (7 mm long) | Core-sheath long-fiber pellets (7 mm long) | Core-sheath long-fiber pellets (7 mm long) | Core-sheath long-fiber pellets (7 mm long) | Core-sheath long-fiber pellets (7 mm long) |
| Fiber dispersibility |  | — | B | A | B | A | A |
| Bending strength |  | — | B | B | C | B | C |
| Notched Izod impact value |  | — | A | A | C | B | B |

TABLE 2

|  |  |  | Working Example 6 | Working Example 7 | Working Example 8 | Working Example 9 | Working Example 10 |
|---|---|---|---|---|---|---|---|
| Reinforcing fiber bundle (A) |  |  | Carbon fibers | Carbon fibers | Carbon fibers | Carbon fibers | Carbon fibers |
|  | Surface oxygen concentration (O/C) | — | 0.06 | 0.06 | 0.06 | 0.06 | 0.06 |
|  | Number of single fibers | pieces | 24,000 | 24,000 | 24,000 | 24,000 | 24,000 |
|  | Mixed amount | wt % | 20 | 20 | 20 | 20 | 20 |
| Mixture of propylene-based resins (B) and (C) |  |  | PP (2) | PP (1) | PP (3) | PP (4) | PP (5) |
| First propylene-based resin (B) | Type | — | b-1 | b-1 | b-1 | b-1 | b-1 |
|  | Mw | — | 90,000 | 90,000 | 90,000 | 90,000 | 90,000 |
|  | Functional groups |  | — | — | — | — | — |
|  | Amount of functional groups | millimole equivalent | — | — | — | — | — |
|  | Mixed amount | wt % | 2 | 3.6 | 3.6 | 3.6 | 3.6 |
| Second propylene-based resin (C) | Type |  | c-2 | c-1 | c-3 | c-4 | c-5 |
|  | Mw | — | 5,000 | 25,000 | 25,000 | 25,000 | 25,000 |
|  | Functional groups |  | COOK | COOK | COOK | COOK | $COONH_4$ |
|  | Functional group conversion ratio | % | 100 | 100 | 100 | 70 | 100 |
|  | Amount of functional groups | millimole equivalent | 0.81 | 0.81 | 0.1 | 0.81 | 0.81 |
|  | Mixed amount | wt % | 0.2 | 0.4 | 0.4 | 0.4 | 0.4 |
| Third propylene-based resin (D) | Type |  | d-1 (50%) d-2 (50%) | d-1 (50%) d-2 (50%) | d-1 (50%) d-2 (50%) | d-1 (50%) d-2 (50%) | d-1 (50%) d-2 (50%) |
|  | Functional groups |  | Maleic anhydride | Maleic anhydride | Maleic anhydride | Maleic anhydride | Maleic anhydride |
|  | Amount of functional groups | millimole equivalent | 0.5 | 0.5 | 0.5 | 0.5 | 0.5 |
|  | Mixed amount | wt % | 76 | 61 | 76 | 76 | 76 |
| Other component (E) | Type |  | — | Terpene resin | — | — | — |
|  | Mixed amount | wt % | — | 15 | — | — | — |

TABLE 2-continued

|  |  | Working Example 6 | Working Example 7 | Working Example 8 | Working Example 9 | Working Example 10 |
|---|---|---|---|---|---|---|
| Void ratio of composite | % | B | A | B | B | B |
| Mode of molding material | — | Core-sheath long-fiber pellets (7 mm long) | Core-sheath long-fiber pellets (7 mm long) | Core-sheath long-fiber pellets (7 mm long) | Core-sheath long-fiber pellets (7 mm long) | Core-sheath long-fiber pellets (7 mm long) |
| Fiber dispersibility | — | A | A | B | B | A |
| Bending strength | — | B | B | C | B | A |
| Notched Izod impact value | — | C | A | C | C | B |

TABLE 3

|  |  |  | Working Example 11 | Working Example 12 | Working Example 13 | Working Example 14 | Working Example 15 |
|---|---|---|---|---|---|---|---|
| Reinforcing fiber bundle (A) |  |  | Carbon fibers | Carbon fibers | Carbon fibers | Carbon fibers | Carbon fibers |
|  | Surface oxygen concentration (O/C) | — | 0.06 | 0.06 | 0.06 | 0.12 | 0.12 |
|  | Number of single fibers | pieces | 24,000 | 24,000 | 24,000 | 24,000 | 24,000 |
|  | Mixed amount | wt % | 20 | 20 | 20 | 20 | 20 |
| Mixture of propylene-based resins (B) and (C) |  |  | PP (6) | PP (7) | PP (8) | PP (1) | PP (1) |
| First propylene-based resin (B) | Type | — | b-1 | b-1 b-2 | b-3 | b-1 | b-1 |
|  | Mw | — | 90,000 | b-1 (90,000) b-2 (300,000) | 70,000 | 90,000 | 90,000 |
|  | Functional groups |  | — | — | COOK | — | — |
|  | Amount of functional groups | millimole equivalent | — | — | 0.81 | — | — |
|  | Mixed amount | wt % | 3.6 | 3.6 | 3.6 | 3.6 | 3.6 |
| Second propylene-based resin (C) | Type |  | c-6 | c-1 | c-1 | c-1 | c-1 |
|  | Mw | — | 40,000 | 25,000 | 25,000 | 25,000 | 25,000 |
|  | Functional groups |  | COOK | COOK | COOK | COOK | COOK |
|  | Functional group conversion ratio | % | 100 | 100 | 100 | 100 | 100 |
|  | Amount of functional groups | millimole equivalent | 0.81 | 0.81 | 0.81 | 0.81 | 0.81 |
|  | Mixed amount | wt % | 0.4 | 0.4 | 0.4 | 0.4 | 0.4 |
| Third propylene-based resin (D) | Type |  | d-1 (50%) d-2 (50%) | d-1 (50%) d-2 (50%) | d-1 (50%) d-2 (50%) | d-1 (50%) d-2 (50%) | d-1 (50%) d-2 (50%) |
|  | Functional groups |  | Maleic anhydride | Maleic anhydride | Maleic anhydride | Maleic anhydride | Maleic anhydride |
|  | Amount of functional groups | millimole equivalent | 0.5 | 0.5 | 0.5 | 0.5 | 0.5 |
|  | Mixed amount | wt % | 76 | 76 | 76 | 76 | 76 |
| Other component (E) | Type |  | — | — | — | — | — |
|  | Mixed amount | wt % | — | — | — | — | — |
| Void ratio of composite |  | % | B | B | B | B | C |
| Mode of molding material |  | — | Core-sheath long-fiber pellets (7 mm long) | Core-sheath long-fiber pellets (7 mm long) | Core-sheath long-fiber pellets (7 mm long) | Core-sheath long-fiber pellets (7 mm long) | Core-sheath long-fiber pellets (7 mm long) |
| Fiber dispersibility |  | — | C | B | B | A | C |
| Bending strength |  | — | B | A | A | A | C |
| Notched Izod impact value |  | — | C | B | B | A | B |

TABLE 4

|  |  |  | Comparative Example 1 | Comparative Example 2 | Comparative Example 3 | Comparative Example 4 | Comparative Example 5 |
|---|---|---|---|---|---|---|---|
| Reinforcing fiber bundle (A) |  |  | Carbon fibers | Carbon fibers | Carbon fibers | Carbon fibers | Carbon fibers |
|  | Surface oxygen concentration (O/C) | — | 0.06 | 0.06 | 0.06 | 0.06 | 0.06 |

TABLE 4-continued

|  |  |  | Comparative Example 1 | Comparative Example 2 | Comparative Example 3 | Comparative Example 4 | Comparative Example 5 |
|---|---|---|---|---|---|---|---|
|  | Number of single fibers | pieces | 24,000 | 24,000 | 24,000 | 24,000 | 24,000 |
|  | Mixed amount | wt % | 20 | 20 | 20 | 20 | 20 |
| Mixture of propylene-based resins (B) and (C) |  |  | — | PP (1) | PP (9) | PP (10) | PP (11) |
| First propylene-based resin (B) | Type |  | — | b-1 | b-1 | b-4 (C-1と同じ) | b-1 |
|  | Mw |  | — | 90,000 | 90,000 | 25,000 | 90,000 |
|  | Functional groups |  | — | — | — | COOK | — |
|  | Amount of functional groups | millimole equivalent | — | — | — | 0.81 | — |
|  | Mixed amount | wt % | — | 15 | 4 | 3.6 | 3.6 |
| Second propylene-based resin (C) | Type |  | — | c-1 | — | c-1 | c-7 |
|  | Mw |  | — | 25,000 | — | 25,000 | 200,000 |
|  | Functional groups |  | — | COOK | — | COOK | COOK |
|  | Functional group conversion ratio | % | — | 100 | — | 100 | 100 |
|  | Amount of functional groups | millimole equivalent | — | 0.81 | — | 0.81 | 0.81 |
|  | Mixed amount | wt % | — | 1.5 | — | 0.4 | 0.4 |
| Third propylene-based resin (D) | Type |  | d-1 (50%) d-2 (50%) | d-1 (50%) d-2 (50%) | d-1 (50%) d-2 (50%) | d-1 (50%) d-2 (50%) | d-1 (50%) d-2 (50%) |
|  | Functional groups |  | Maleic anhydride | Maleic anhydride | Maleic anhydride | Maleic anhydride | Maleic anhydride |
|  | Amount of functional groups | millimole equivalent | 0.5 | 0.5 | 0.5 | 0.5 | 0.5 |
|  | Mixed amount | wt % | 60 | 63.5 | 76 | 76 | 76 |
| Other component (E) | Type |  | — | — | — | — | — |
|  | Mixed amount | wt % | — | — | — | — | — |
| Void ratio of composite |  | % | — | A | B | B | B |
| Mode of molding material |  |  | Long fiber pellets could not be produced. | Core-sheath long-fiber pellets (7 mm long) | Core-sheath long-fiber pellets (7 mm long) | Core-sheath long-fiber pellets (7 mm long) | Core-sheath long-fiber pellets (7 mm long) |
| Fiber dispersibility |  |  | — | A | D | B | D |
| Bending strength |  |  | — | D | D | C | D |
| Notched Izod impact value |  |  | — | D | D | D | C |

As shown above, in Working Examples 1 to 15, molding materials (long-fiber pellets) were excellent in handling properties, and molded articles with excellent mechanical properties could be obtained by using those molding materials.

On the other hand, in Comparative Example 1, since the carbon fiber bundle was not impregnated at all, a molding material (long-fiber pellets) could not be produced. Further, the molding materials obtained in Comparative Examples 2 to 5 were not good in both fiber dispersibility and mechanical properties.

Working Example 16

The continuous carbon fiber bundle obtained in Reference Example 1 was impregnated with an emulsion obtained by adjusting the emulsion of the propylene-based resin mixture PP (1) produced in Reference Example 3 to a solid concentration of 6 wt % by a roller impregnation method, and dried online at 210° C. for 2 minutes, to remove water. The properties of the obtained carbon fiber bundle are stated in Table 3. The adhering amount of the propylene-based resin mixture PP (1) was 3 wt %. The obtained carbon fiber bundle was used to measure the fiber surface covering ratio, to count the number of friction fluff pieces and to evaluate the processability and interfacial shear strength.

The obtained carbon fiber bundle was cut at a length of 6 mm using a cartridge cutter, to obtain a chopped carbon fiber bundle. The chopped carbon fiber bundle was used to evaluate the bulk density. Property evaluation results are stated in Table 5.

Working Example 17

A carbon fiber bundle was produced and evaluated as described in Working Example 16, except that the emulsion of the propylene-based resin mixture PP (1) was adjusted to a solid concentration of 0.6 wt %. Property evaluation results are stated in Table 5.

Working Example 18

A carbon fiber bundle was produced and evaluated as described in Working Example 16, except that the emulsion of the propylene-based resin mixture PP (1) was adjusted to a solid concentration of 2 wt %. Property evaluation results are stated in Table 5.

Working Example 19

A carbon fiber bundle was produced and evaluated as described in Working Example 16, except that the emulsion of the propylene-based resin mixture PP (2) produced in Reference Example 4 was used. Property evaluation results are stated in Table 5.

Working Example 20

A carbon fiber bundle was produced and evaluated as described in Working Example 16, except that the emulsion of the propylene-based resin mixture PP (6) produced in Reference Example 8 was used. Property evaluation results are stated in Table 5.

Working Example 21

A carbon fiber bundle was produced and evaluated as described in Working Example 16, except that the emulsion of the propylene-based resin mixture PP (1) was adjusted to a solid concentration of 30 wt %. Property evaluation results are stated in Table 6.

Working Example 22

A carbon fiber bundle was produced and evaluated as described in Working Example 16, except that the emulsion of the propylene-based resin mixture PP (3) produced in Reference Example 5 was used. Property evaluation results are stated in Table 6.

Working Example 23

A carbon fiber bundle was produced and evaluated as described in Working Example 16, except that the emulsion of the propylene-based resin mixture PP (4) produced in Reference Example 6 was used. Property evaluation results are stated in Table 6.

Working Example 24

A carbon fiber bundle was produced and evaluated as described in Working Example 16, except that the emulsion of the propylene-based resin mixture PP (5) produced in Reference Example 7 was used. Property evaluation results are stated in Table 6.

Working Example 25

A carbon fiber bundle was produced and evaluated as described in Working Example 16, except that the emulsion of the propylene-based resin mixture PP (13) produced in Reference Example 16 was used. Property evaluation results are stated in Table 6.

Working Example 26

A carbon fiber bundle was produced and evaluated as described in Working Example 16, except that the emulsion of the propylene-based resin mixture PP (7) produced in Reference Example 9 was used. Property evaluation results are stated in Table 7.

Working Example 27

A carbon fiber bundle was produced and evaluated as described in Working Example 16, except that the emulsion of the propylene-based resin mixture PP (8) produced in Reference Example 10 was used. Property evaluation results are stated in Table 7.

Working Example 28

A carbon fiber bundle was produced and evaluated as described in Working Example 16, except that the continuous carbon fiber bundle obtained in Reference Example 2 was used. Property evaluation results are stated in Table 7.

Comparative Example 6

The continuous carbon fiber bundle obtained in Reference Example 1 was evaluated as described in Working Example 16, without allowing the carbon fiber bundle to be impregnated with the propylene-based resin mixture. Property evaluation results are stated in Table 7.

Comparative Example 7

The emulsion of the propylene-based resin mixture PP (1) produced in Reference Example 3 was adjusted to a solid concentration of 30 wt %, and the continuous carbon fiber bundle obtained in Reference Example 1 was impregnated with the adjusted emulsion by a roller impregnation method and subsequently dried online at 210° C. for 2 minutes, to remove water. The obtained carbon fiber bundle was again impregnated with the emulsion obtained by adjusting the emulsion of the propylene-based resin mixture PP (1) to a solid concentration 30 wt % by a roller impregnation method, and subsequently dried online at 210° C. for 2 minutes, to remove water, for producing a carbon fiber bundle that was then evaluated as described in Working Example 16. Property evaluation results are stated in Table 7.

Comparative Example 8

A carbon fiber bundle was produced and evaluated as described in Working Example 16, except that the n-hexane suspension of the propylene-based resin mixture PP (9) produced in Reference Example 11 was used. Property evaluation results are stated in Table 8.

Comparative Example 9

A carbon fiber bundle was produced and evaluated as described in working Example 16, except that the emulsion of the propylene-based resin mixture PP (10) produced in Reference Example 12 was used. Property evaluation results are stated in Table 8.

Comparative Example 10

A carbon fiber bundle was produced and evaluated as described in Working Example 16, except that the emulsion of the propylene-based resin mixture PP (11) produced in Reference Example 13 was used. Property evaluation results are stated in Table 8.

Comparative Example 11

A carbon fiber bundle was produced and evaluated as described in Working Example 16, except that the emulsion of the propylene-based resin mixture PP (14) produced in Reference Example 17 was used. Property evaluation results are stated in Table 8.

TABLE 5

| | | | Working Example 16 | Working Example 17 | Working Example 18 | Working Example 19 |
|---|---|---|---|---|---|---|
| Reinforcing fibers (A) | | | Carbon fibers 1 | Carbon fibers 1 | Carbon fibers 1 | Carbon fibers 1 |
| | Surface oxygen concentration (O/C) | — | 0.06 | 0.06 | 0.06 | 0.06 |
| | Number of single fibers | pieces | 24,000 | 24,000 | 24,000 | 24,000 |
| Mixture of propylene-based resins | | | PP (1) | PP (1) | PP (1) | PP (2) |
| First propylene-based resin (B) | Type | — | b-1 | b-1 | b-1 | b-1 |
| | Mw | — | 90,000 | 90,000 | 90,000 | 90,000 |
| | Functional groups | | — | — | — | — |
| | Amount of functional groups | millimole equivalent | — | — | — | — |
| Second propylene-based resin (C) | Type | | c-1 | c-1 | c-1 | c-2 |
| | Mw | — | 25,000 | 25,000 | 25,000 | 5,000 |
| | Functional groups | | COOK | COOK | COOK | COOK |
| | Functional group conversion ratio | % | 100 | 100 | 100 | 100 |
| | Amount of functional groups | millimole equivalent | 0.81 | 0.81 | 0.81 | 0.81 |
| Mixing ratio of (B)/(C) | | parts by weight | 91/9 | 91/9 | 91/9 | 91/9 |
| Amount of propylene-based resins adhered to 100 parts by weight of reinforcing fibers | | parts by weight | 3 | 0.3 | 1 | 3 |
| Fiber surface covering ratio | | % | 90 | 40 | 75 | 90 |
| Handling properties of reinforcing fibers | Number of friction fluff pieces | — | B | C | C | B |
| | Processability | — | B | B | B | B |
| | Bulk density of chopped reinforcing fiber bundle | — | B | C | C | B |
| Interface shear strength | | — | B | D | C | C |

TABLE 6

| | | | Working Example 21 | Working Example 22 | Working Example 23 | Working Example 24 | Working Example 25 |
|---|---|---|---|---|---|---|---|
| Reinforcing fibers (A) | | | Carbon fibers 1 | Carbon fibers 1 | Carbon fibers 1 | Carbon fibers 1 | Carbon fibers 1 |
| | Surface oxygen concentration (O/C) | — | 0.06 | 0.06 | 0.06 | 0.06 | 0.06 |
| | Number of single fibers | pieces | 24,000 | 24,000 | 24,000 | 24,000 | 24,000 |
| Mixture of propylene-based resins | | | PP (1) | PP (3) | PP (4) | PP (5) | PP (13) |
| First propylene-based resin (B) | Type | — | b-1 | b-1 | b-1 | b-1 | b-1 |
| | Mw | — | 90,000 | 90,000 | 90,000 | 90,000 | 90,000 |
| | Functional groups | | — | — | — | — | — |
| | Amount of functional groups | millimole equivalent | — | — | — | — | — |
| Second propylene-based resin (C) | Type | | c-1 | c-3 | c-4 | c-5 | c-8 |
| | Mw | — | 25,000 | 25,000 | 25,000 | 25,000 | 25,000 |
| | Functional groups | | COOK | COOK | COOK | $COONH_4$ | $(COO)_2Zn$ |
| | Functional group conversion ratio | % | 100 | 100 | 70 | 100 | 100 |
| | Amount of functional groups | millimole equivalent | 0.81 | 0.1 | 0.81 | 0.81 | 0.81 |
| Mixing ratio of (B)/(C) | | parts by weight | 91/9 | 91/9 | 91/9 | 91/9 | 91/9 |
| Amount of propylene-based resins adhered to 100 parts by weight of reinforcing fibers | | parts by weight | 20 | 3 | 3 | 3 | 3 |
| Fiber surface covering ratio | | % | 100 | 90 | 90 | 90 | 90 |
| Handling properties of reinforcing fibers | Number of friction fluff pieces | — | A | B | B | B | B |
| | Processability | — | C | B | B | B | B |
| | Bulk density of chopped reinforcing fiber bundle | — | A | B | B | B | B |
| Interface shear strength | | — | C | C | D | B | B |

TABLE 7

|  |  |  | Working Example 26 | Working Example 27 | Working Example 28 | Comparative Example 6 | Comparative Example 7 |
|---|---|---|---|---|---|---|---|
| Reinforcing fibers (A) |  |  | Carbon fibers 1 | Carbon fibers 1 | Carbon fibers 1 | Carbon fibers 1 | Carbon fibers 1 |
|  | Surface oxygen concentration (O/C) | — | 0.06 | 0.06 | 0.12 | 0.06 | 0.06 |
|  | Number of single fibers | pieces | 24,000 | 24,000 | 24,000 | 24,000 | 24,000 |
| Mixture of propylene-based resins |  |  | PP (7) | PP (8) | PP (1) | — | PP (1) |
| First propylene-based resin (B) | Type | — | b-1 b-2 | b-3 | b-1 | — | b-1 |
|  | Mw | — | b-1 (90,000) b-2 (300,000) | 70,000 | 90,000 | — | 90,000 |
|  | Functional groups |  | — | COOK | — | — | — |
|  | Amount of functional groups | millimole equivalent | — | 0.81 | — | — | — |
| Second propylene-based resin (C) | Type | — | c-1 | c-1 | c-1 | — | c-1 |
|  | Mw | — | 25,000 | 25,000 | 25,000 | — | 25,000 |
|  | Functional groups |  | COOK | COOK | COOK | — | COOK |
|  | Functional group conversion rate | % | 100 | 100 | 100 | — | 100 |
|  | Amount of functional groups | millimole equivalent | 0.81 | 0.81 | 0.81 | — | 0.81 |
| Mixing ratio of (B)/(C) |  | parts by weight | 91/9 | 91/9 | 91/9 | — | 91/9 |
| Amount of propylene-based resins adhered to 100 parts by weight of reinforcing fibers |  | parts by weight | 3 | 3 | 3 | — | 40 |
| Fiber surface covering rate |  | % | 90 | 90 | 90 | — | 100 |
| Handling properties of reinforcing fibers | Number of friction fluff pieces | — | B | B | B | D | A |
|  | Processability | — | B | B | B | C | C |
|  | Bulk density of chopped reinforcing fiber bundle | — | B | B | B | D | A |
| Interface shear strength |  | — | C | C | A | E | D |

TABLE 8

|  |  |  | Comparative Example 8 | Comparative Example 9 | Comparative Example 10 | Comparative Example 11 |
|---|---|---|---|---|---|---|
| Reinforcing fibers (A) |  |  | Carbon fibers 1 | Carbon fibers 1 | Carbon fibers 1 | Carbon fibers 1 |
|  | Surface oxygen concentration (O/C) | — | 0.06 | 0.06 | 0.06 | 0.06 |
|  | Number of single fibers | pieces | 24,000 | 24,000 | 24,000 | 24,000 |
| Mixture of propylene-based resins |  |  | PP (9) | PP (10) | PP (11) | PP (1) |
| First propylene-based resin (B) | Type | — | b-1 | b-4 (The same as c-1) | b-1 | b-1 |
|  | Mw | — | 90,000 | 25,000 | 90,000 | 90,000 |
|  | Functional groups |  | — | COOK | — | — |
|  | Amount of functional groups | millimole equivalent | — | 0.81 | — | — |
| Second propylene-based resin (C) | Type | — | — | c-1 | c-7 | c-1 |
|  | Mw | — | — | 25,000 | 200,000 | 25,000 |
|  | Functional groups |  | — | COOK | COOK | COOK |
|  | Functional group conversion rate | % | — | 100 | 100 | 100 |
|  | Amount of functional groups | millimole equivalent | — | 0.81 | 0.81 | 0.81 |
| Mixing ratio of (B)/(C) |  | parts by weight | (B) only | (C) only | 91/9 | 40/60 |
| Amount of propylene-based resins adhered to 100 parts by weight of reinforcing fibers |  | parts by weight | 3 | 3 | 3 | 3 |
| Fiber surface covering rate |  | % | 90 | 90 | 90 | 90 |
| Handling properties of reinforcing fibers | Number of friction fluff pieces | — | C | B | B | B |
|  | Processability | — | C | B | B | C |
|  | Bulk density of chopped reinforcing fiber bundle | — | C | B | B | B |
| Interface shear strength |  | — | E | E | E | E |

As shown above, in Working Examples 16 to 28, the reinforcing fiber bundles were excellent in handling properties, and molded articles excellent in mechanical properties could be obtained by using those reinforcing fiber bundles.

On the other hand, in Comparative Example 6, the carbon fiber bundle was impregnated with nothing, and was low in adhesiveness. Further, the number of friction fluff pieces was large, and the bulk density of the chopped carbon fiber bundle was low, showing very poor handling properties. Further, in Comparative Examples 6 to 11, the reinforcing fiber bundles were relatively good in handling properties but were lower in adhesiveness than those of the working examples.

INDUSTRIAL APPLICABILITY

When the long fiber-reinforced thermoplastic resin molding material of this invention is injection-molded, the reinforcing fibers can be well dispersed into the molded article, and the molded article produced is excellent in mechanical properties. Further, the resin-adhered reinforcing fiber bundle of this invention is excellent in handling properties, and in the case where a polyolefin-based resin, especially polypropylene resin is used as the matrix resin, the resin-adhered reinforcing fiber bundle exhibits excellent adhesiveness, allowing a fiber-reinforced thermoplastic resin article with high mechanical properties can be produced by molding. The obtained molded article can be used for various applications such as housings and parts of electric and electronic apparatuses, housings of personal computers, and members and the like of motor vehicles.

MEANINGS OF SYMBOLS

1 . . . Single fiber of a reinforcing fiber bundle (A)
2 . . . Mixture consisting of a first propylene-based resin (B) and a second propylene-based resin (C)
3 . . . . Composite consisting of a reinforcing fiber bundle (A), a second propylene-based resin (B) and a third propylene-based resin (C)
4 . . . Third propylene-based resin (D)
5 . . . Creel containing a powder clutch
6 . . . Friction pin processed to be specular on the surface
7 . . . Fluff counter
8 . . . Drive rollers
9 . . . winder
10 . . . Roller
A . . . Carbon fiber running direction

The invention claimed is:

1. A molding material comprising the following components (A) to (D) at the following ratios, in which the component (D) is bonded to a composite comprising the components (A) to (C), the order in the weight average molecular weight is component (D) >component (B) >component (C), and, with regard to mixing ratio of component (B) and component (C), content of component (C) is 0.3 to 0.45 parts by weight per 100 parts by weight of component (B);

(A) 1 to 75 wt % of a reinforcing fiber bundle, wherein the reinforcing fibers constituting the bundle are carbon fibers;

(B) 0.01 to 10 wt % of a substantially unmodified first propylene-based resin containing 0 to less than 0.05 millimole equivalent in total per 1 gram of the resin of carboxylic acid groups and/or carboxylate groups;

(C) 0.01 to 10 wt % of a second propylene-based resin having (i) carboxylate groups or (ii) carboxylic acid groups and carboxylate groups bound to the polymer chains thereof, where the total concentration of (i) or (ii) is 0.05 to 5 millimole equivalents per 1 gram of the resin, and the molar ratio of the amount of carboxylate groups to the total amount of the carboxylic acid groups and carboxylate groups is 85 to 100%; and (D) 5 to 98.98 wt % of a third propylene-based resin;

wherein component (A) is arranged almost in parallel to the axial center direction of the molding material and the length of the reinforcing fibers constituting the component (A) is substantially the same as the length of the molding material;

and wherein the molding material has a core-sheath structure in which component (D) covers the outer circumference of the composite comprising components (A) to (C).

2. The molding material, according to claim 1, wherein the weight average molecular weight of component (C) is in a range from 1,000 to 50,000.

3. The molding material, according to claim 1, wherein component (B) has carboxylate groups bound to polymer chains thereof and has a weight average molecular weight of more than 50,000 and not more than 150,000.

4. The molding material, according to claim 1, wherein component (D) comprises 5 to 50 wt % of a propylene-based resin (D-1) having carboxylic acid groups and/or carboxylate groups bound to polymer chains thereof and 50 to 95 wt % of a propylene-based resin (D-2) not having carboxylic acid groups and/or carboxylate groups.

5. The molding material, according to claim 4, wherein the order of millimole equivalents of carboxylic acid groups and/or carboxylate groups per 1 gram of each resin is component (C) >component (B) ≥component (D).

* * * * *